US012656789B2

(12) United States Patent
Colvin et al.

(10) Patent No.: US 12,656,789 B2
(45) Date of Patent: Jun. 16, 2026

(54) COLLISION AVOIDANCE SYSTEM FOR AUTONOMOUSLY OR REMOTELY OPERATING ROBOTIC ASSETS

(71) Applicant: Battelle Memorial Institute, Columbus, OH (US)

(72) Inventors: Gregory Colvin, Columbus, OH (US); Garrett Dowd, Columbus, OH (US); Jeffrey Keip, Columbus, OH (US); Noah Limes, Columbus, OH (US); Kevin O'Toole, Hilliard, OH (US); Greg Baumgardner, Davenport, FL (US)

(73) Assignee: Battelle Memorial Institute, Columbus, OH (US)

( * ) Notice: Subject to any disclaimer, the term of this patent is extended or adjusted under 35 U.S.C. 154(b) by 62 days.

(21) Appl. No.: 18/633,752

(22) Filed: Apr. 12, 2024

(65) Prior Publication Data

US 2025/0258504 A1 Aug. 14, 2025

Related U.S. Application Data

(60) Provisional application No. 63/459,470, filed on Apr. 14, 2023.

(51) Int. Cl.
G05D 1/693 (2024.01)
G05D 1/248 (2024.01)
(Continued)

(52) U.S. Cl.
CPC ............. G05D 1/693 (2024.01); G05D 1/248 (2024.01); G05D 1/6987 (2024.01); G05D 1/80 (2024.01); G05D 2105/35 (2024.01)

(58) Field of Classification Search
None
See application file for complete search history.

(56) References Cited

U.S. PATENT DOCUMENTS

| | | | |
|---|---|---|---|
| 8,477,021 B2 * | 7/2013 | Slack | B60Q 9/008 |
| | | | 342/70 |
| 10,011,277 B2 * | 7/2018 | Meinhart | B60T 7/22 |

(Continued)

FOREIGN PATENT DOCUMENTS

| | | | | |
|---|---|---|---|---|
| EP | 4322119 A1 * | 2/2024 | | G06V 20/56 |
| WO | WO-2021028709 A1 * | 2/2021 | | G05B 9/02 |

OTHER PUBLICATIONS

Islam, et al., "Person Following by Autonomous Robots: A Categorical Overview", to appear at the IJRR, Pri-print 2019, pp. 1-32.

(Continued)

*Primary Examiner* — Rachid Bendidi
*Assistant Examiner* — Nada Mahyoob Alqaderi
(74) *Attorney, Agent, or Firm* — Secant IP, PLLC; Donald G. Weiss

(57) ABSTRACT

The present disclosure provides vehicle collision avoidance system (CAS) that includes a first CAS module for a robotic vehicle that includes an interface to a first network; a hard stop interface communicatively coupled to the robotic vehicle; one or more computer processors; one or more computer readable storage media; and program instructions stored on the one or more computer readable storage media for execution by at least one of the one or more computer processors, the stored program instructions including instructions to: determine a relative position of a second CAS module based on information from the first network; responsive to determining that the second CAS module is within a first distance from the first CAS module, issue an alert; and responsive to determining that the second CAS module is within a second distance from the first CAS module, transmit a hard stop signal to the robotic vehicle.

6 Claims, 18 Drawing Sheets

(51) Int. Cl.
G05D 1/698 (2024.01)
G05D 1/80 (2024.01)
G05D 105/35 (2024.01)

(56) References Cited

U.S. PATENT DOCUMENTS

| 2012/0098653 A1* | 4/2012 | Slack | G08G 1/163 |
| | | | 340/435 |
| 2012/0101701 A1* | 4/2012 | Moshchuk | B60W 30/09 |
| | | | 701/70 |
| 2015/0329130 A1* | 11/2015 | Carlson | B61L 15/0027 |
| | | | 246/122 R |
| 2017/0325443 A1* | 11/2017 | Crinklaw | A01M 7/0014 |
| 2017/0349168 A1* | 12/2017 | Meinhart | B60W 30/095 |
| 2020/0234559 A1* | 7/2020 | Chen | A63F 13/211 |
| 2020/0380878 A1* | 12/2020 | Cohen | G05D 1/00 |
| 2022/0383750 A1* | 12/2022 | Sharma Banjade | G08G 1/005 |
| 2024/0091944 A1* | 3/2024 | Hopkinson | B25J 13/08 |
| 2024/0259277 A1* | 8/2024 | Chou | H04L 67/51 |

OTHER PUBLICATIONS

Sarmento, et al., "FollowMe—A Pedestrian Following Algorithm for Agricultural Logistic Robots", 2022 IEEE International Conference on Autonomous Robot Systems and Competitions (ICARSC) Santa Maria da Feira, Portugal, Apr. 29-30, 2022, pp. 179-185.

* cited by examiner

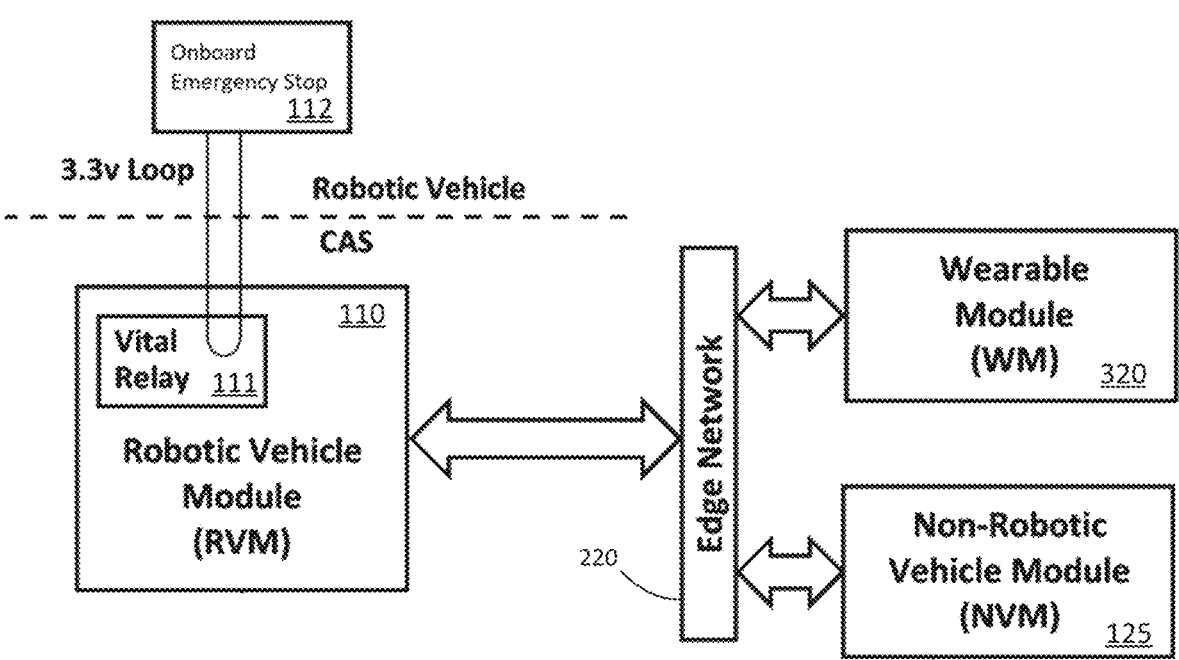
FIG. 3A

300B

FIG. 6

Robot2 110-2

Ready

RVM2 is likewise monitoring RVM1, so it is a race condition which RVM first predicts a collision. This is a form of "Check Redundancy" even though the function is instantiated on two different vehicles and the exchanged comparison data is only whether a Vehicle 1 – Vehicle 2 intersection is detected

VST1 112

Alert is repeated to affected entities as long as the intersection exists. Mitigate against message loss and RVM 2 reset due to, e.g., power cycle.

Safing

Robot2 110-2

Robot1 110-1

Ready

Monitor (Op. 602)

Heartbeat (Op.604)

Monitor (Op. 606)

Predicted Collision (Op. 608)

Safing

Hard Stop (Op. 610)

Alert (Op. 612)

Stopped (Op. 614)

Safed

Robot1 110-1

VST1 112

COLLISION AVOIDANCE SYSTEM FOR AUTONOMOUSLY OR REMOTELY OPERATING ROBOTIC ASSETS

CROSS-REFERENCE TO RELATED APPLICATIONS

The present application claims the benefit of the filing date of U.S. Provisional Application Ser. No. 63/459,470, filed Apr. 14, 2023, the entire teachings of which application is hereby incorporated herein by reference.

STATEMENT REGARDING FEDERALLY SPONSORED RESEARCH OR DEVELOPMENT

This invention was made with government support under Contract No. IAC MAC P1 19-2051-PM-FP awarded by the United States Army Combat Capabilities Development Command (DEVCOM) Ground Vehicle Systems Center (GVSC). The government has certain rights in the invention.

TECHNICAL FIELD

The present application relates generally to a collision avoidance system for autonomously or remotely operating robotic assets.

BACKGROUND

Autonomously or remotely operating robotic assets create collision hazards such as serious bodily injury to nearby personnel. For example, when testing robotic assets, safety observers are typically employed within the Line of Sight (LoS) of the robotic entity under test to stop, via wireless hard stop remote devices, when an unsafe situation arises. There are numerous safety concerns with this current mitigation strategy, including human error; loss of LoS; maintaining radio communication with the hard stop based on distance, obstacles, radio spectrum saturation, antenna orientation, etc.; additional chase vehicles in the area causing congestion; and personnel required to operate hard stops and the chase vehicles. To decrease these hazards and the reliance on the safety observer, there exists a need for a system that can predict and stop robotic vehicles which are dangerously close to personnel or other bodies, vehicles, or objects in the area of operation.

BRIEF DESCRIPTION OF THE DRAWINGS

Reference should be made to the following detailed description which should be read in conjunction with the following figures, wherein like numerals represent like parts.

FIG. 3A is an illustrative example block diagram of a basic collision avoidance system for autonomously or remotely operating robotic assets, consistent with the present disclosure.

FIG. 6 is an illustrative example of a sequence diagram for a predicted collision, vehicle to vehicle, consistent with the present disclosure.

FIG. 8 is an illustrative example of a sequence diagram for a predicted collision and recovery, vehicle to vehicle, consistent with the present disclosure.

DETAILED DESCRIPTION

Figure 1A:
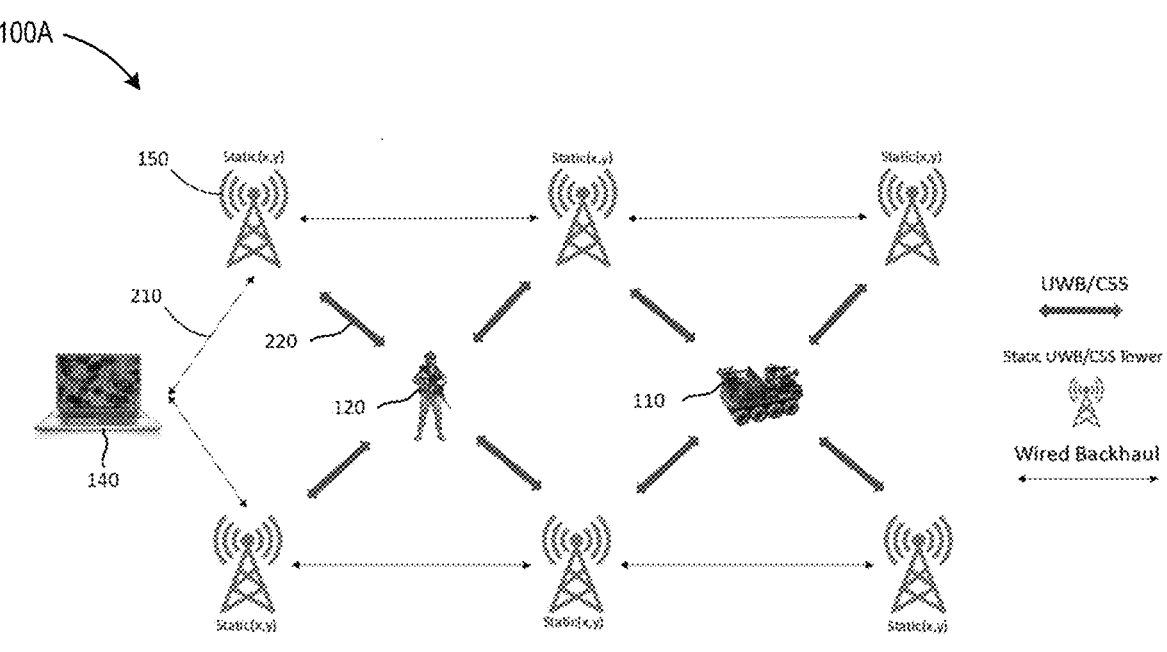
FIG. 1A is an illustrative example of a traditional Real-time Location System (RTLS).

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

Autonomously or remotely operating robotic assets create collision hazards such as serious bodily injury to nearby personnel. For example, when testing robotic assets, safety observers are typically employed within the LoS of the robotic entity under test to initiate a hard stop when an unsafe situation arises. There are numerous safety concerns with this current mitigation strategy, including human error; loss of LoS; maintaining radio communication with the hard stop, based on distance, obstacles, radio spectrum saturation, antenna orientation, etc.; additional chase vehicles in the area causing congestion; and personnel required to operate hard stop(s) and chase vehicle(s).

There exists a need to decrease hazards and reliance on the safety observer, and to predict and stop robotic vehicles which are dangerously close to personnel and other vehicles within an operating area. Disclosed herein is a collision avoidance system (CAS) that will automatically request a hard stop to prevent collisions with CAS Equipped Entities (CEE) without human intervention.

The CAS disclosed herein is a vehicle agnostic safety system for autonomous vehicles. It is intended to detect CEE in the path of a robotic vehicle and to request a hard stop via an onboard platform hard stop, such as a Vehicle Safety Transponder (VST), to prevent a collision. A CEE can be personnel, or any natural or man-made object equipped for CAS detection. The CAS system will work independently of other vehicle systems (except the VST) to avoid common mode failures.

The disclosed system is an independent, vehicle agnostic safety system. Robotic Vehicle Module(s) (RVMs) have minimal interface to the vehicle (typically power and hard stop), and the system provides an additional layer of protection on top of any other existing safety systems. The system meets all applicable safety standards and uses Wearable Module(s) (WM) that are small, unobtrusive, and easily accepted by a mobile user, e.g., a dismount.

With the CAS system in operation in an area, when a robotic vehicle approaches a non-robotic entity (e.g., a user such as a dismount equipped with a WM or a Transportation, Motor Pool (TMP) vehicle equipped with a non-robotic vehicle module (NVM, described below), etc.)) there is a visual, audible, and/or haptic caution to all affected entities. If this caution fails to motivate action to remedy the situation and the distance continues to shorten, the CAS will request the VST hard stop the robotic vehicle. Upon requesting a hard stop, a visual, audible, and/or haptic warning will be given to all involved entities. Finally, when employed, the optional Centralized Monitoring Station (CMS) will continuously update vehicle position, relative distance and velocity, and vehicle states.

As used in this disclosure, the CAS architecture includes the following four types of CAS modules. The system, however, is not limited to these four types of CAS modules. Other modules may be added, and modules may be subtracted, as required.

The first module included in the disclosed system is the RVM. The RVM is the module incorporated into an unmanned robotic vehicle, either autonomous or controlled by a robot operator. The main functions of the RVM are to warn personnel, detect collisions, and activate the vehicle hard stop.

The second module included in the disclosed system is the WM. The WM is the module worn or carried by a user, e.g. a dismount such as a soldier, who is operating outside of a vehicle. The main function of the WM is to warn personnel of proximity to a robotic vehicle, in particular of an imminent collision with a robotic vehicle.

The third module included in the disclosed system is the NVM. The NVM is the module incorporated into a manned vehicle and is used by personnel onboard a human-operated vehicle. The main function of the NVM is to warn personnel of proximity to a robotic vehicle, in particular of an imminent collision with a robotic vehicle.

The fourth module included in the disclosed system is the CMS. The CMS is an optional module that is not included in the basic CAS system but may be incorporated if a core network is available and a centralized control is desirable. The CMS is a computing device operated by a CAS Supervisor, and functions to observe CAS hard stops and coordinate returning to normal exercise activities post hard stop.

At the conceptual core of CAS is the requirement for a safety-critical positioning engine. CAS is able to measure the relative positions of entities, e.g., in polar coordinates, to prevent collisions. To measure the relative positions of the entities, CAS includes both a core network, i.e., a backbone spanning the entire area of interest, and an edge network, a lower power, short range, low data rate, intermittent link among CEEs. CAS may use the Time of Flight (ToF) of signals over the edge network to determine the relative position of other CEEs on the network. To calculate ToF, both multilateration and Two Way Ranging (TWR) techniques may be employed. In some embodiments, a one-dimensional relative distance combined with polar coordinates may be used to determine a two-dimensional relative position of the entities.

TWR uses a relative time duration, e.g., by counting pulses, and knowledge of the propagation speed of the signal to determine the relative position between two entities. The CEEs use the edge network to provide the TWR information to determine the relative position. In some embodiments, the CAS edge network uses a combination of Chirp Spread Spectrum (CSS) and Ultra-Wide Band (UWB) radios for communication and ranging. As the CEEs communicate, the devices measure the time of flight of the UWB and CSS signal between them. In some embodiments, this is accomplished by measuring the round-trip time and the response delay. From the time of flight, each CEE can calculate the Euclidian distance of the signal propagation path and thus the distance between the two devices. The CEEs can also implement mobile positioning using multilateration or one-dimensional relative distance combined with polar coordinates may be used to determine a two-dimensional relative position of the entities.

This allows for the CEEs to determine relative distance between each other, as well as relative position when multiple CEEs are within range of the edge network. In some embodiments, the CAS may use Global Navigation Satellite Systems (GNSS) to determine absolute position. In these embodiments, one or more of the CEEs have integrated GNSS units and a capability to connect, for example, via the core network, to GNSS correction data, which may include, but are not limited to, Realtime Kinematics correction signals. Once a CEE, such as an RVM, has determined an absolute position via the GNSS, that position may be used to determine the absolute position of other CEEs within range of the edge network.

To measure 2D position, a CEE measures the distance/range (as described herein) and an Angle of Arrival (AoA) of the signal. In some embodiments, the CEEs measure the relative position of entities in polar coordinates. To measure the AoA, one or more of the entities may be equipped with an antenna array (2 or more antenna elements, not shown). This antenna array may use phase information of the signal (such as phase difference of arrival or correlative interferometry) or it may use directional antennas to measure the received power of the signal. In some embodiments, only the RVM will have this antenna array.

This combination of relative positioning and absolute positioning using the combination of the edge network and the GNSS utilizing the core network allows for a system of mobile positioning that does not require fixed anchors. In other embodiments, without GNSS reception on any CAS module, global absolute positioning may include using fixed infrastructure with known, unchanging absolute positions, e.g., three communication towers (also known as "anchors" in the context of real time locations systems) that an entity ranges to. This ranging can either be "downstream" where the entity calculates its own absolute position (like GNSS), or "upstream" where the communication towers and/or some central entity calculates the position of the mobile entity. In general, these methods would be described as multilateration. In the context of CAS system of the present disclosure, such communication towers may be implemented using UWB and CSS ranging radios. However, absolute positioning can also be achieved, with low resolution, using existing fixed communication infrastructure such as cellular networks. In other embodiments, absolute position may be estimated using a single communication tower if an antenna array is used to measure angle of arrival. In this context absolute position would be measured directly in polar coordinates (range and angle).

FIG. 1A is an illustrative example of a traditional RTLS. The example system of FIG. 1A includes RVM 110, a robotic vehicle under either autonomous or remote human control, and dismount 120, a user, e.g., a soldier, not in a vehicle (i.e., on foot). FIG. 1A also includes an optional CMS 140. In order to determine position, relative distance, and velocity, the example system in FIG. 1A uses fixed anchors 150, which may be, for example, static UWB/CSS towers, which typically connect to a wired backhaul system. In the example system of FIG. 1A, the position, relative distance, and velocity of the RVM 110 and dismount 120 cannot be determined without the fixed anchors.

Figure 1B:
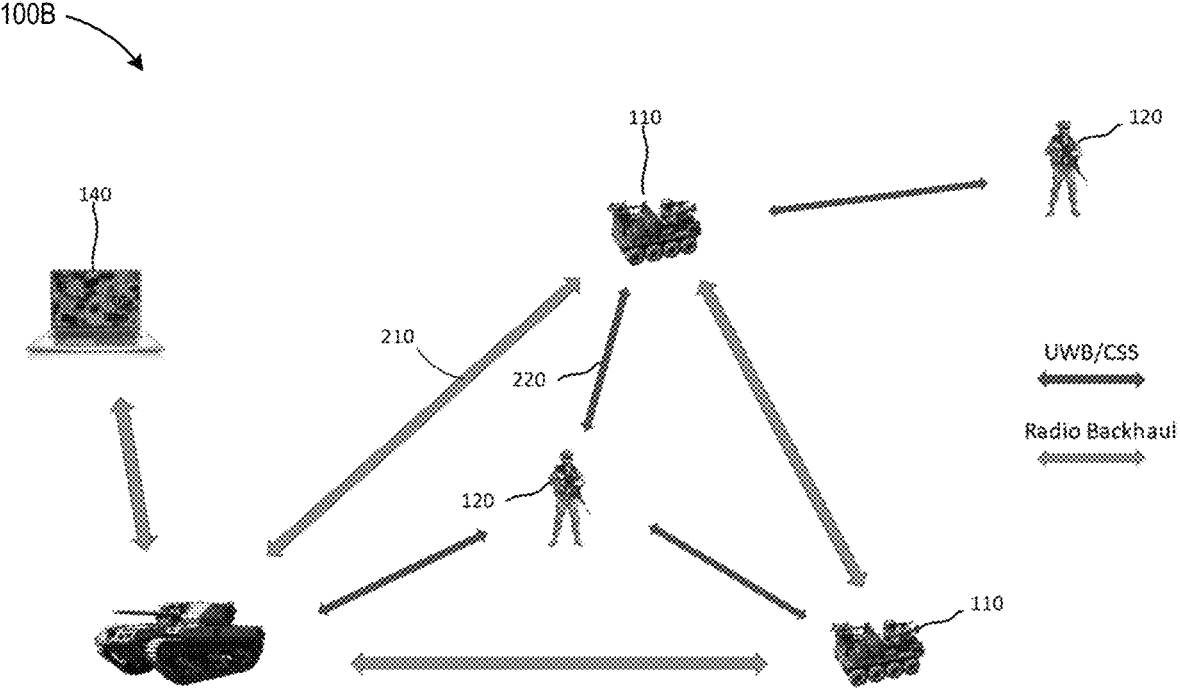
FIG. 1B is an illustrative example of a mobile RTLS, consistent with the present disclosure.

FIG. 1B is an illustrative example of a mobile RTLS, consistent with the present disclosure. The example system of FIG. 1B includes multiple robotic vehicles RVM 110 and dismount 120. FIG. 1B also includes the optional CMS 140. The system of FIG. 1B does not, however, include any fixed anchors as in FIG. 1A. Instead, in order to determine position, relative distance, and velocity, the example system in FIG. 1B uses mobile anchors, whereby each module communicates with each other module within range using the edge network. The position, relative distance, and velocity of each other module within the range is determined by using ToF methods over the edge network.

Time of Flight (ToF) ranging measures the distance between two devices by measuring how long it takes an electromagnetic wave to propagate from one device to another. The propagation speed of an electromagnetic wave in a vacuum or a given medium (like air) is constant and known, thus if a device can determine the propagation time, then the distance can be calculated. There are multiple approaches and methods to determine the propagation time, however they can all be broadly grouped into two categories, one-way ranging, and two-way ranging.

One-way ranging (OWR) uses communication towers (or orbiting satellites) with known absolute locations to provide absolute positioning of moving entities. Common examples include global navigation satellite systems (GNSS), positioning via cellular towers, and many real-time locations systems (RTLS) designed for indoor/warehouse use. Under one-way ranging, a signal is only sent in one direction, from device A to device B. It is important to note that in general, OWR requires time-synchronized infrastructure with known locations. In the case of cellular towers, their location is known because they are permanently deployed at a surveyed location and time synchronized via a centralized cable network. In the case of GNSS, the orbital mechanics of the satellites are well understood so the position of the satellite at the current or future time can be calculated.

One-way ranging techniques are often decomposed into downlink and uplink categories. The most common downlink system is GNSS, where orbiting satellites send time synchronized signals to the earth's surface that enable people and vehicles to calculate their global position using the signals from the satellites. An uplink system allows a central processor to calculate the position of moving entities. An example of an uplink system is an RTLS where "tags" emit a signal that is received by multiple time synchronized "anchors" which enables a central processor to calculate the position of the emitting tag.

OWR uplink systems make use of a category of methods known as multilateration. Multilateration, also known as hyperbolic positioning, is the process of locating an object by accurately computing the time difference of arrival (TDOA) of a signal emitted from the object to three or more receivers. For context, trilateration is the simpler case where only three or less receivers exist. Triangulation uses angles, not distances, to determine position.

Two-way ranging (TWR) is bidirectional. At minimum this means a signal is propagated from Entity A to Entity B and back to Entity A. In this case Entity A is referred to as the "Initiator" and Entity B the "Responder." Unlike one-way ranging, two-way ranging does not require infrastructure or time synchronization, however, in systems with no infrastructure, two-way ranging only provides a one-dimensional range measurement rather than a 2D or three-dimensional (3D) position.

Two-way ranging can be further decomposed into solitary and collaborative method categories. Solitary two-way ranging has been widely deployed for decades in applications that are often described as "sensing." Solitary methods often rely on the transmitted signal to passively reflect from the responder entity that is being ranged to. This often leads to high levels of environmental noise and sophisticated signal processing techniques must be employed to filter out the noise. Solitary ranging can fail for many reasons including the signal not reaching the responder, the signal not reflecting from the responder, the signal becoming lost in environmental noise, and signal processing techniques failing to filter and identify the return signal. Solitary methods could also be described as uncooperative.

Collaborative two-way ranging, on the other hand, describes the methods where the responding entity actively transmits a response or return signal. At minimum, the initiator transmits a signal, the responder receives the signal and then transmits a signal of its own, and finally the initiator receives the signal from the responder.

Therefore, collaborative two-way ranging is defined by an exchange of signals (e.g., messages/frames/packets). Additional ranging exchanges have been devised to address performance limitations that are beyond the scope of this disclosure.

Figure 2:
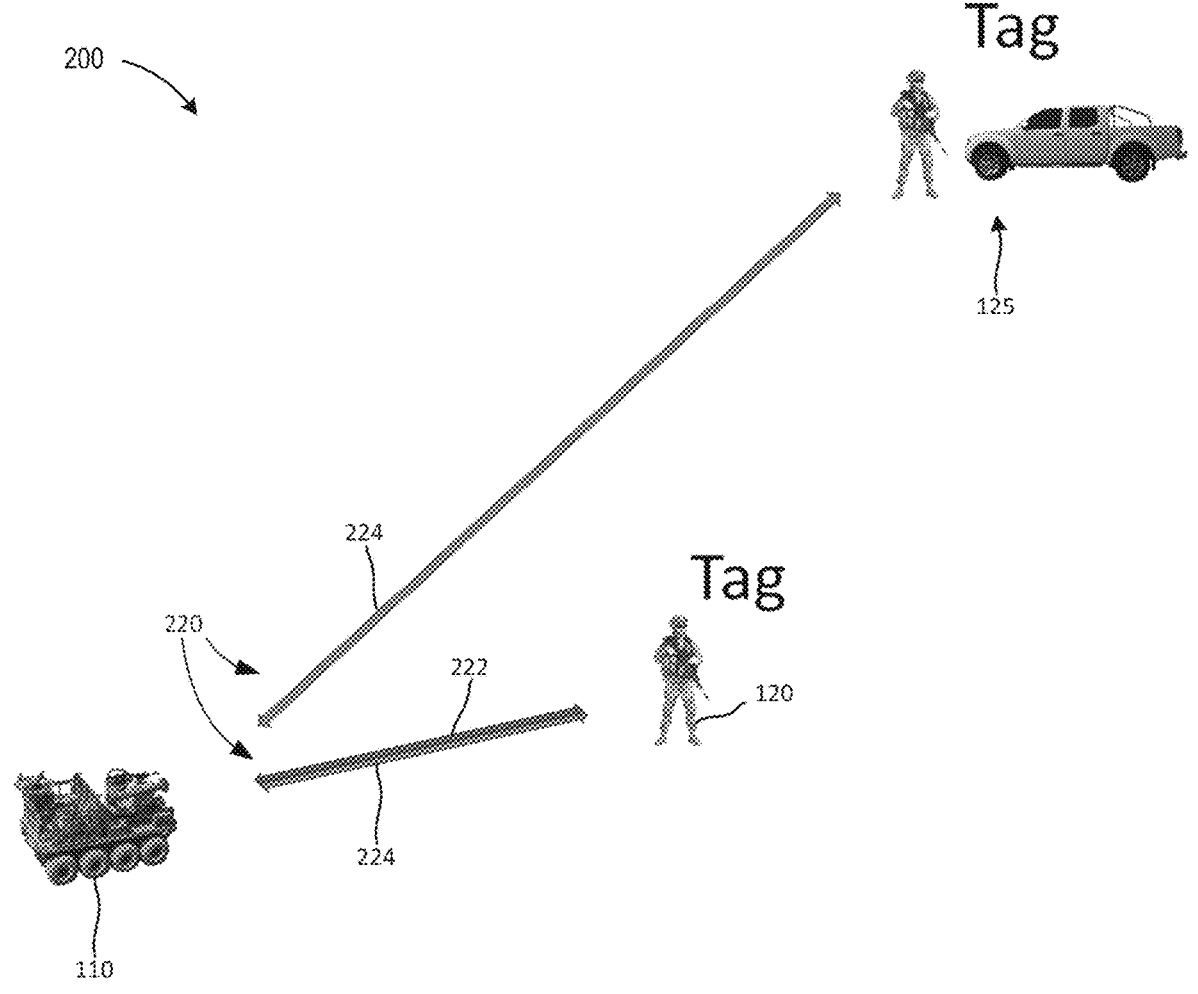
FIG. 2 is an illustrative example of an edge network for a mobile RTLS, consistent with the present disclosure.

FIG. 2 is an illustrative example of an edge network for a mobile RTLS, consistent with the present disclosure. The example of FIG. 2 shows the primary ranging capability of the edge network 220. As described above, the edge network consists of a UWB network 222 and a CSS network 224. The CSS network 224 provides a longer range, but lower accuracy ranging capability. The UWB, on the other hand, provides greater accuracy for ranging than the CSS, but at a shorter range.

In the case of only two modules within range of each other, the two modules can determine relative distance (and angle, i.e., 2D position) between them. The example of FIG. 2 includes RVM 110 within range of dismount 120 on both the CSS 224 network and the UWB 222 network. FIG. 2 also includes NVM 125 within range of RVM 110, but only over the CSS 224 network, and therefore the accuracy of the range is lower than that of dismount 120.

FIG. 3A is an illustrative example block diagram of a basic collision avoidance system for autonomously or remotely operating robotic assets, consistent with the present disclosure. The example system of FIG. 3A includes RVM 110, which incorporates vital relay 111, which interfaces to VST 112 to provide a hard stop for the robotic vehicle containing RVM 110. The functions of the RVM 110 may include, but are not limited to, providing entity identification, determining absolute position, tracking CEE relative distance, performing collision detection, annunciating collision alerts, managing VST communications, indicating status, and performing CAS monitoring.

The example system of FIG. 3A also includes WM 320, the wearable module worn by a user, such as a dismount. The functions of the WM 320 may include, but are not limited to, providing entity identification, tracking CEE relative distance, annunciating collision alerts, and indicating status.

The example system of FIG. 3A also includes NVM 125, a non-robotic, or manned, vehicle equipped with CAS. The functions of the NVM 125 may include, but are not limited to, providing entity identification, determining absolute position, tracking CEE relative distance, annunciating collision alerts, and indicating status.

Figure 3B:
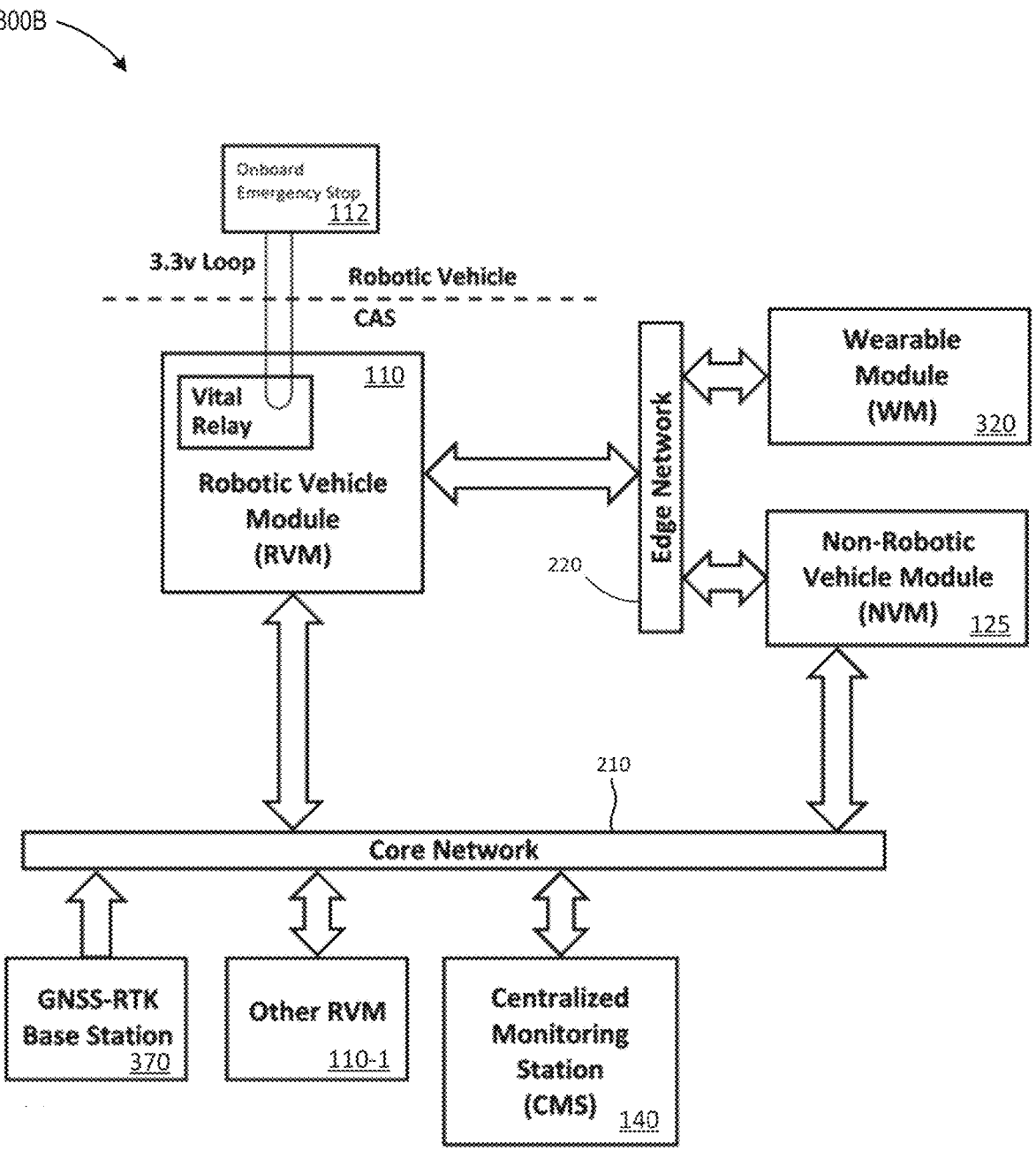
FIG. 3B is an illustrative example block diagram of an extended collision avoidance system for autonomously or remotely operating robotic assets, consistent with the present disclosure.

FIG. 3B is an illustrative example block diagram of an extended collision avoidance system for autonomously or remotely operating robotic assets, consistent with the present disclosure. The extended CAS system of FIG. 3B may include all the modules discussed in FIG. 3A, but in addition incorporates core network 210 and several optional components that may connect to core network 210.

In addition to edge network 220, the example system of FIG. 3B may include, but is not limited to, an additional RVM 110-1, a CMS 140 to provide CAS monitoring, and a GNSS base station 370 to determine absolute positioning.

Figure 4:
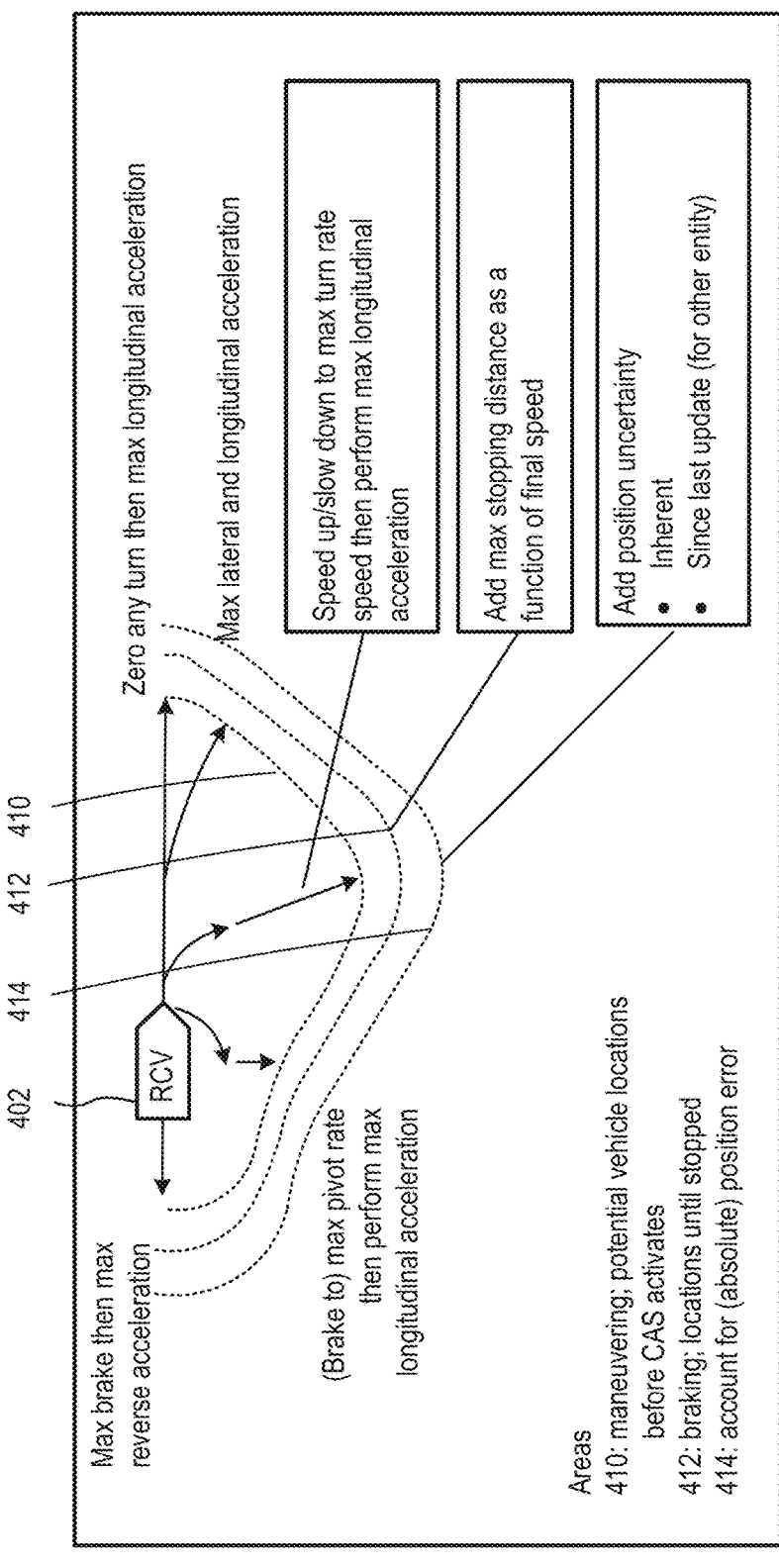
FIG. 4 is an illustrative example of the protection zones around a robotic asset, consistent with the present disclosure.

FIG. 4 is an illustrative example of the protection zones around a robotic asset, consistent with the present disclosure. In some embodiments, CAS may have two protection zones, one to issue alerts and another to take a safety action. The size of the protection zones must account for the type of vehicle including weight and braking performance; relative distance, bearing and closing velocity with the entity; environmental factors such as surface conditions and gradient; and reaction time latencies. In other embodiments, there may be n-number of zones, where each zone may be associated with a particular feedback (e.g., soft noise in an outer zone, progressively louder as entities move closer to one another, etc.).

The size of the protection zone for robotic vehicle 402 of FIG. 4 is determined as follows. Area 410 is the maneuvering area, illustrating potential vehicle locations before CAS activates. To determine this area for a given vehicle, several different maneuvering scenarios must be calculated. These include zeroing any turn and then applying maximum longitudinal acceleration, maximum lateral and longitudinal acceleration, braking to the maximum pivot rate, and then performing maximum longitudinal acceleration, and maximum braking then applying maximum reverse acceleration. The maneuvering area, for the example robotic vehicle of FIG. 4 is indicated by area 410.

Once the maneuvering area for the robotic vehicle has been determined, the maximum stopping distance as a function of the final speed must be added to the maneuvering area. This stopping area is indicated by line 412. Finally, the position uncertainty must be added to the stopping area to account for both the inherent position uncertainty, i.e., the uncertainty caused by factors such as the position accuracy of the edge network, as well as latency caused by factors such as the last update for the other entity, processing latency, etc. The final protection zone is indicated by line 414.

Figure 5:
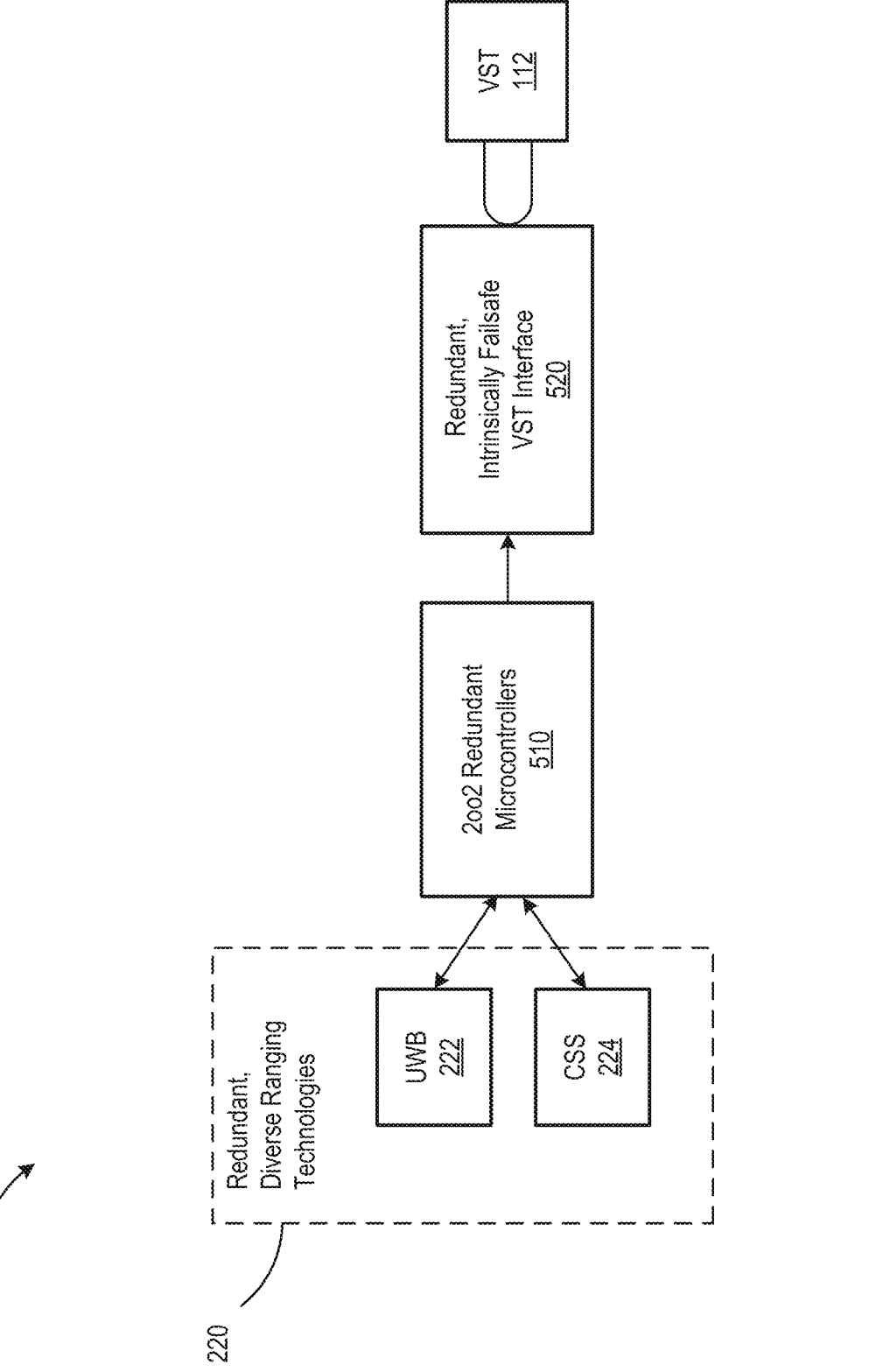
FIG. 5 is an illustrative example block diagram of the safety architecture of the CAS, consistent with the present disclosure.

FIG. 5 is an illustrative example block diagram of the safety architecture of the CAS, consistent with the present disclosure. The following high-level safety concepts are integrated into the CAS architecture to ensure failsafe operation. All the CAS modules use microcontroller-based equipment for performing safety critical functions that may include two processors arranged in a two-out-of-two (2oo2) checked redundancy configuration. 2oo2 checked redundancy employs two devices in an arrangement where both devices must "agree" to allow continued operation of robotic assets. In any case that the two devices do not agree, the failsafe operation of the system will cause the system to perform a hard stop. In 2oo2 checked redundancy, the two processors may continuously compare data, and if the two processors have any conflicting data, either processor may transmit the hard stop signal to the robotic vehicle. In any case where any conflicting data is detected, any device may cause any other device to hard stop for safety. As used herein, the term data may include, but is not limited to, all potential intersections, states, modes, data, calculations, etc.

This example incorporates 2oo2 redundant microcontrollers 510. It should be noted that for overall safety requirements, a hard stop command may be issued by any module/controller, and such a command would override any contrary command.

The wireless ranging uses redundant and diverse technologies that independently determine the relative position of each entity. As shown in FIG. 5, two redundant, diverse ranging technologies are used within edge network 220, UWB 222 and CSS 224. In some embodiments, devices (entities) on the edge network may be actively monitored, for example, using redundant transceivers, etc.

CAS uses both redundant and intrinsically failsafe designs for directly interfacing with the hard stop, as shown in redundant, intrinsically failsafe VST interface 520 that interfaces with VST 112.

FIG. 6 is an illustrative example of a sequence diagram 600 for a predicted collision, vehicle to vehicle, consistent with the present disclosure. In the example scenario of FIG. 6, two robotic vehicles, robot1 110-1 and robot2 110-2, each equipped with an RVM for CAS and a VST, are operating within an area, and robot2 110-2 is approaching robot1 110-1. Initially, the RVMs on both robot1 110-1 and robot2 110-2 are in the ready state.

In operation 602, while robot1 110-1 and robot2 110-2 are communicating (note, if both are on the core network, they are always communicating) they monitor each other for protection zone intersections. Robot2 110-2 is likewise monitoring robot1 110-1, so it is a race condition which RVM first predicts a collision. This is a form of "Check Redundancy" even though the function is instantiated on two different vehicles and the exchanged comparison data is only whether a Vehicle 1-Vehicle 2 intersection is detected. In the example of FIG. 6, robot1 110-1 is the first to predict a collision, so the sequence diagram is based on this assumption. Of course, if robot2 110-2 first predicted the collision, the sequence would be reversed so that robot2 110-2 would initiate the hard stop, but the outcome would be the same, i.e., both robots in a hard stop and safed condition.

In operation 604, robot1 110-1 sends out a heartbeat, which is a safety signal. If robot2 110-2 does not receive the heartbeat within a predetermined period of time, it determines that communications with robot1 110-1 has been lost and will go into a safed condition (hard stop). In other embodiments, and depending on the capabilities of a given entity, loss of communications may not necessarily result in a hard stop of an entity, for example, if that entity has sufficient processing capabilities and redundancy to otherwise satisfy safety and tolerance requirements.

In operation 606, robot1 110-1 continues to monitor robot2 110-2. In operation 608, robot1 110-1 has predicted a collision based on overlap of protection zones as described in FIG. 4. As a result of the predicted collision, robot1 110-1 transitions into a safing mode. The safing mode is needed as a latch until the vehicle fully stops. During safing mode, robot1 110-1 is alerting any affected entities. Safing mode is also potentially needed to reject any offboard RVM mode requests; if those exist, see subsequent scenarios in FIGS. 7 and 8 below. In addition, the alert is repeated to affected entities as long as the intersection exists. The system mitigates against message loss and a possible robot2 110-2 reset due to, for example, a power cycle.

In operation 610, robot1 110-1 issues a hard stop to vst1 112, the VST in robot1 110-1, to cause robot1 110-1 to hard stop. Robot1 110-1 then sends an alert in operation 612 to robot2 110-2, causing robot2 110-2 to enter safing mode. Since this is a safety critical function, Robot2 110-2 trusts the prediction of a collision from robot1 110-1, even if robot2 110-2 does not agree. Upon receiving the alert from robot1 110-1, robot2 110-2 commands its own hard stop via the VST on robot2 110-2. Receiving an alert to hard stop is a safety-related function. In operation 614, robot1 110-1 has performed a hard stop, and the condition is now safed.

At the end of the scenario in FIG. 6, since the intersection of robot1 110-1 and robot2 110-2 still exists, both robot1 110-1 and robot2 110-2 remain safed and thus cannot move until the system is returned to normal operation. The process for returning these systems to normal operation is discussed in the next sections and shown in FIG. 8.

Figure 7:
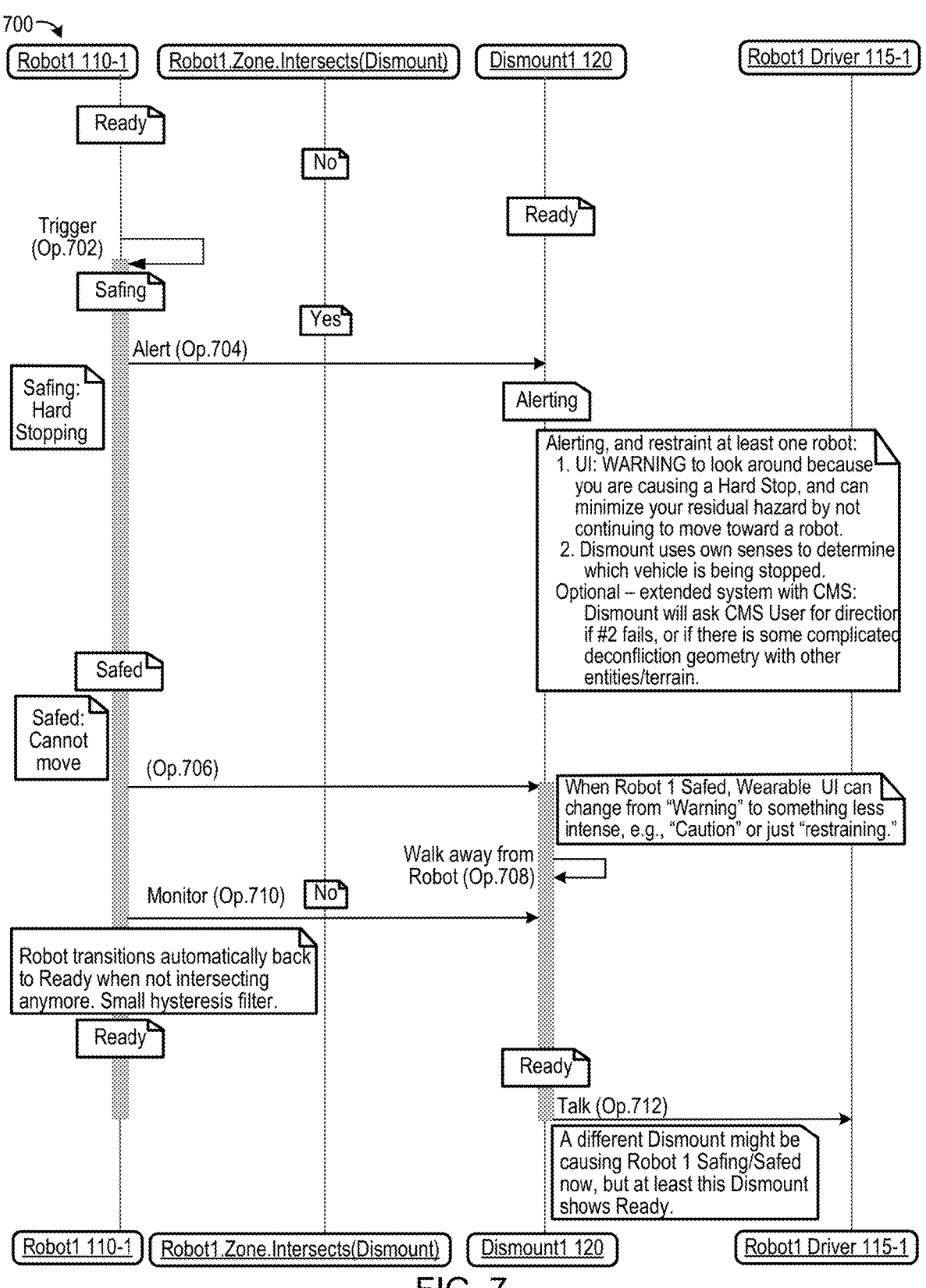
FIG. 7 is an illustrative example of a sequence diagram for a predicted collision and recovery, vehicle to dismount, consistent with the present disclosure.

FIG. 7 is an illustrative example of a sequence diagram 700 for a predicted collision and recovery, vehicle to dismount, consistent with the present disclosure. In the example scenario of FIG. 7, robotic vehicle robot1 110-1 is operating within an area, and robot1 110-1 is approaching dismount1 120. Initially, both robot1 110-1 and dismount1 120 are in the ready state, while the state of Robot1.Zone. Intersects (Dismount) is no, i.e., robot1 110-1 does not detect any impending intersection with dismount 120. For simplicity, the CAS RVM mobility protector mode and events are shown on the lifeline for robot1 110-1. Likewise, the WM for dismount1 120 is shown on the dismount1 120 lifeline.

In operation 702, robot1 110-1 has determined that there is a possible intersection with dismount1 120, so it triggers a response and enters the safing mode. The state of Robot1.Zone. Intersects (Dismount) transitions to yes since the intersection has been detected, and in operation 704, robot1 110-1 sends out an alert to dismount1 120. Robot1 110-1 initiates a hard stop to the VST in robot1 110-1, and the condition of dismount1 120 transitions to alerting, and restraining at least one robot. When a WM on a dismount receives an alert, it transitions to alerting, and because the alert is due to safing, the WM aggressively notifies the dismount that a robot in the immediate vicinity is hard stopping.

In some embodiments, this may result in a "WARNING" message to dismount1 120 on a UI to look around because dismount1 120 is causing a hard stop on at least one robot, and dismount1 120 can minimize any residual hazard by not continuing to move toward a robot. Dismount1 120 may determine which vehicle is being stopped. In some embodiments, the CAS may have an optional CMS. In these embodiments, dismount1 120 may ask a CMS user for direction if dismount1 120 cannot determine which vehicle is being stopped, or if there is some complicated deconfliction geometry with other entities/terrain.

In operation 706, robot1 110-1 sends a message to dismount1 120 that robot1 110-1 is now safed and cannot move. When robot1 110-1 is safed, the UI on the WM for dismount1 120 can change from "WARNING" to something less intense, e.g., "Caution" or just "restraining."

In this example scenario, in response to receiving the alert from robot1 110-1, dismount1 120 walks away from robot1 110-1 in operation 708. This results in the state of Robot1.Zone. Intersects (Dismount) transitioning to no, i.e., there is no current intersection. Since the state of Robot1.Zone. Intersects (Dismount) is no, robot1 110-1 in operation 710 continues to monitor.

Robot1 110-1 automatically transitions back to the ready condition when it is no longer intersecting. In some embodiments, there may be a small hysteresis filter incorporated into the state transitions when moving into the recovery mode to avoid continuously transitioning from safed to ready conditions caused by small movements of dismount1 120. Dismount1 120 also transitions to the ready condition.

In operation 712, dismount1 120 may tell robot1driver 115-1 that dismount1 120 is clear based on an indication from the UI on the WM, however unless dismount1 120 can see the state of robot1 110-1, another entity may have entered the protection zone of robot1 110-1 to prevent its movement.

Robot1 110-1 may automatically re-enter ready, and become drivable again, when it detects no intersections. This transition is not a safety-critical or safety-related function since other entities are still protected when future intersections are detected. In some embodiments robot1driver 115-1 must perform a non-trivial sequence of events to drive the robot again.

After robot1 110-1 is safed, the intersection may no longer exist, depending on the implementation of "intersects" as well as the robot-dismount geometry at the time robot1 110-1 is completely stopped. At which point the scenario would pick up at the robot1 110-1 ready state indicated above. If the intersection remains though, to clear up the conflict with robot1 110-1, dismount1 120 must first identify which robot is being stopped by CAS. While identification of the affected robot is in most cases obvious, other circumstances can work against the identification methods already listed, such as multiple robots are in the area (like in convoy or close formation or staging area), multiple robots are being hard stopped, or there is no line of sight to the robot, e.g., it is around a corner, smoke is being deployed, or the exercise is at night.

In these corner cases, if the optional CMS is in use, dismount1 120 will benefit from information on "where to walk to deconflict" so that the exercise can continue (and the dismount does not cause additional hard stops for other robots).

After robot identification, dismount1 120 walks far enough away from robot1 110-1 and notices the WM automatically transitioning to ready, which is communication from robot1 110-1 that robot1 110-1 no longer detects any protection zone intersection.

Figure 8:
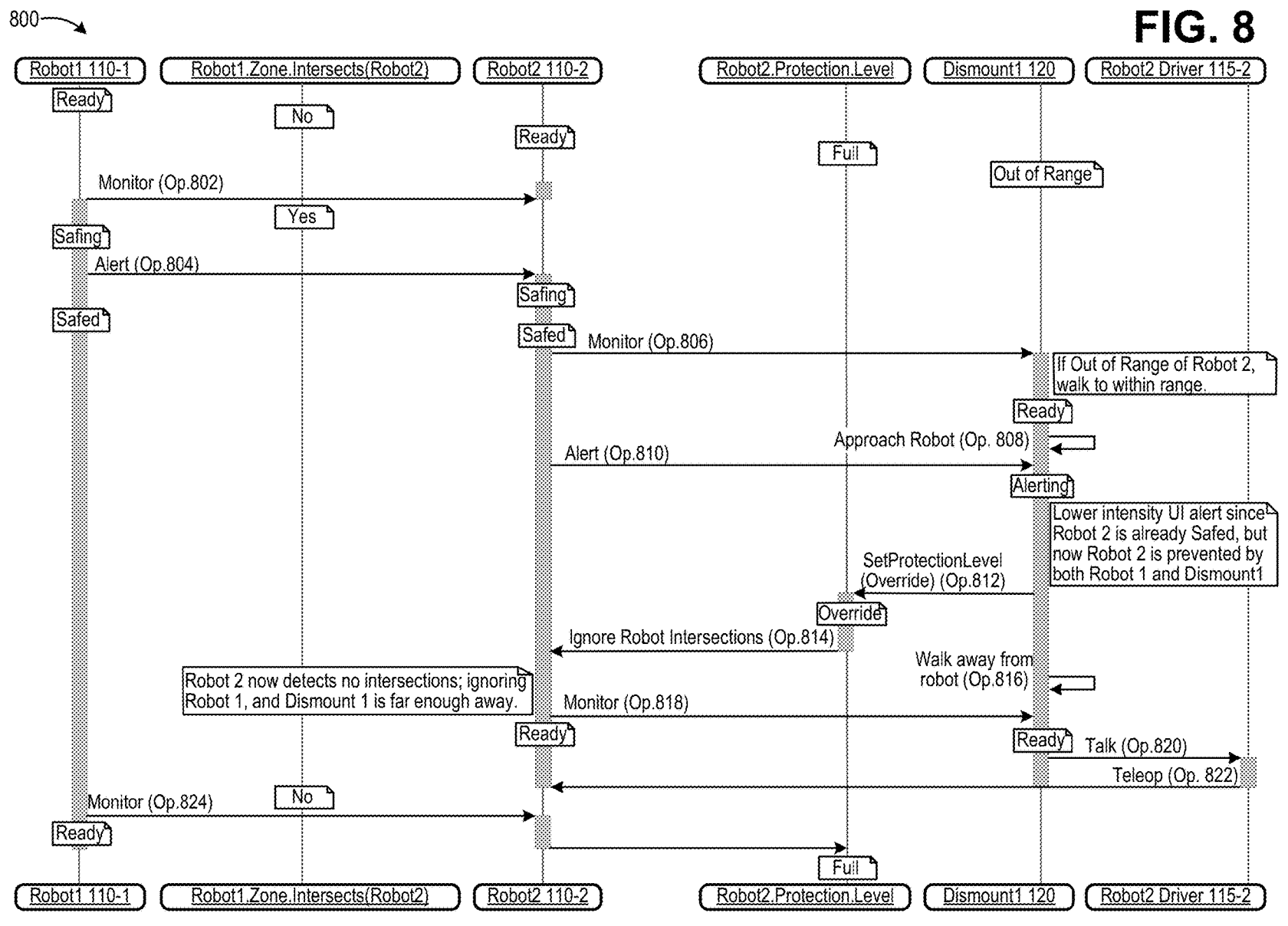

FIG. 8 is an illustrative example of a sequence diagram 800 for a predicted collision and recovery, vehicle to vehicle, consistent with the present disclosure. In the example scenario of FIG. 8, two robotic vehicles, robot1 110-1 and robot2 110-2, each equipped with an RVM for CAS and a VST, are operating within an area. Initially, the RVMs on both robot1 110-1 and robot2 110-2 are in the ready state, Robot1.Zone. Intersects (Robot2) is no, i.e., robot1 110-1 does not detect any impending intersection with robot2 110-2, Robot2.Protection.Level is full, and the status of dismount1 120 is "out of range."

It may be the case that after robot1 110-1 and robot2 110-2 stop, the protection zone geometry results in no intersection, so they would both automatically re-enter to ready and be able to continue without any other intervention. However, the example scenario of FIG. 8 contemplates a "deadlock" condition where robot1 110-1 is preventing robot2 110-2 and vice versa.

In operation 802, robot1 110-1 is monitoring, and predicts a collision with robot2 110-2. As a result, Robot1.Zone. Intersects (Robot2) transitions to yes, and robot1 110-1 transitions to safing. In operation 804, robot1 110-1 sends an alert to robot2 110-2, causing robot2 110-2 to also transition to safing. Both robots then enter the safed condition.

In operation 806, robot2 110-2 monitors dismount1 120, which has a status of ready. In the example scenario of FIG. 8, if dismount1 120 is "out of range," then dismount1 120 walks to within range in operation 808. In response, robot2 110-2 sends an alert in operation 810, and dismount1 120 then transitions into the alerting condition. As dismount1 120 approaches robot2 110-2, the WM on dismount1 120 will alert, but a loud "WARNING" is not appropriate because the robot is stopped. In this case, this is a lower intensity UI alert since robot2 110-2 is prevented by both robot1 110-1 and dismount1 120.

Dismount1 120 uses the UI in the RVM in robot2 110-2 to request to enter Override mode in operation 812. This causes Robot2.Protection.Level to transition to override, and to send a message to robot2 110-2 to ignore the robot intersections in operation 814. Dismount1 120 walks away from robot2 110-2 in operation 816, and since intersection with robot1 110-1 is ignored (due to Override mode) and dismount1 120 is outside the protection zone for robot1 110-1, robot2 110-2 automatically enters the ready condition and continues to monitor in operation 818. Robot2 110-2 now detects no intersections, ignoring robot1 110-1 because of the override, and dismount1 120 is far enough away. Robot2 110-2 continues to monitor in operation 818. Both robot2 110-2 and dismount1 120 transition to the ready condition.

In this scenario, dismount1 120 may talk to robot2driver 125 in operation 820 to notify the driver he is out of range of robot2 110-2, and that it is safe for robot2driver 125 to begin operations with robot2 110-2. Dismount1 120 then walks away, and since the intersection with robot1 110-1 is ignored (due to Override mode) and dismount 1 is outside the protection zone of robot1 110-1, robot2 110-2 automatically enters ready. In operation 822, during "ready+override" mode, robot2driver 125 can take over and move the robot somewhere it will not intersect robot1 110-1. Robot2driver 125 can request deconfliction information from the eyes-on dismount1 120 (relative directions like "turn left") or, from the CMS User (relative or cardinal direction of deconfliction) if the optional CMS is in use.

Finally, in operation 824, robot1 110-1 transitions to ready and continues to monitor, and Robot2.Protection.Level transitions to full.

Figure 9:
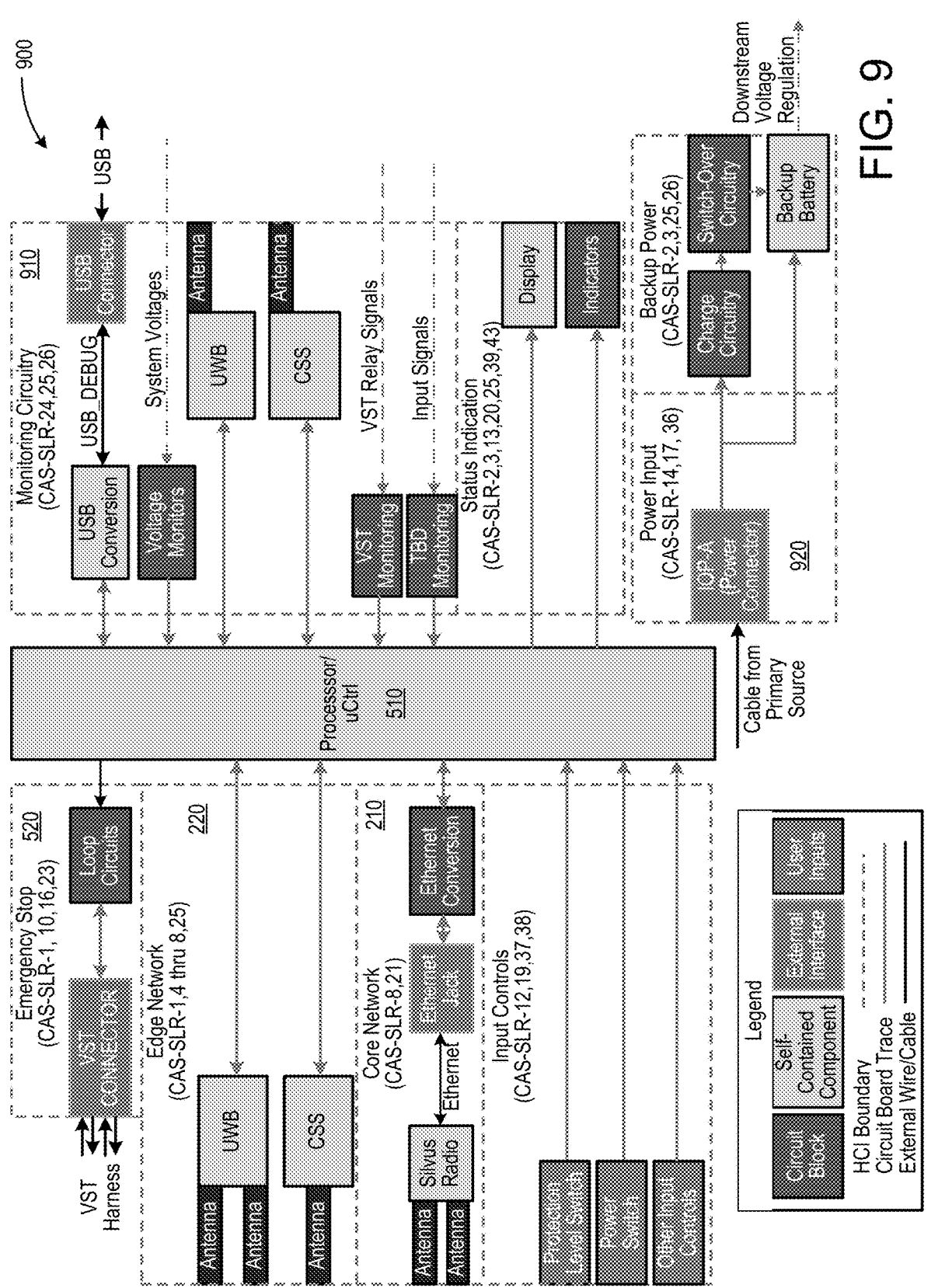
FIG. 9 is an illustrative example block diagram of the robotic vehicle module (RVM), consistent with the present disclosure.

FIG. 9 is an illustrative example block diagram of the RVM, generally designated 900, consistent with the present disclosure. The example of FIG. 9 includes computing device 510, which may be a pair of computing devices using the 2oo2 redundancy as in FIG. 5. The emergency stop function includes VST interface 520 that interfaces with VST in the robotic vehicle, to effect a hard stop when an intersection is detected and the relative position of the intersecting entity is within the predetermined threshold. The RVM also includes edge networks 220 and core network 210, and power circuitry 920, which includes the power input as well as the backup power.

Also included is monitoring circuitry 910, which may monitor functions such as the edge networks 220, including both the UWB and CSS, the VST interface and status of the VST, optional USB interface, system voltages, and provide status indicators and/or displays.

Figure 10:
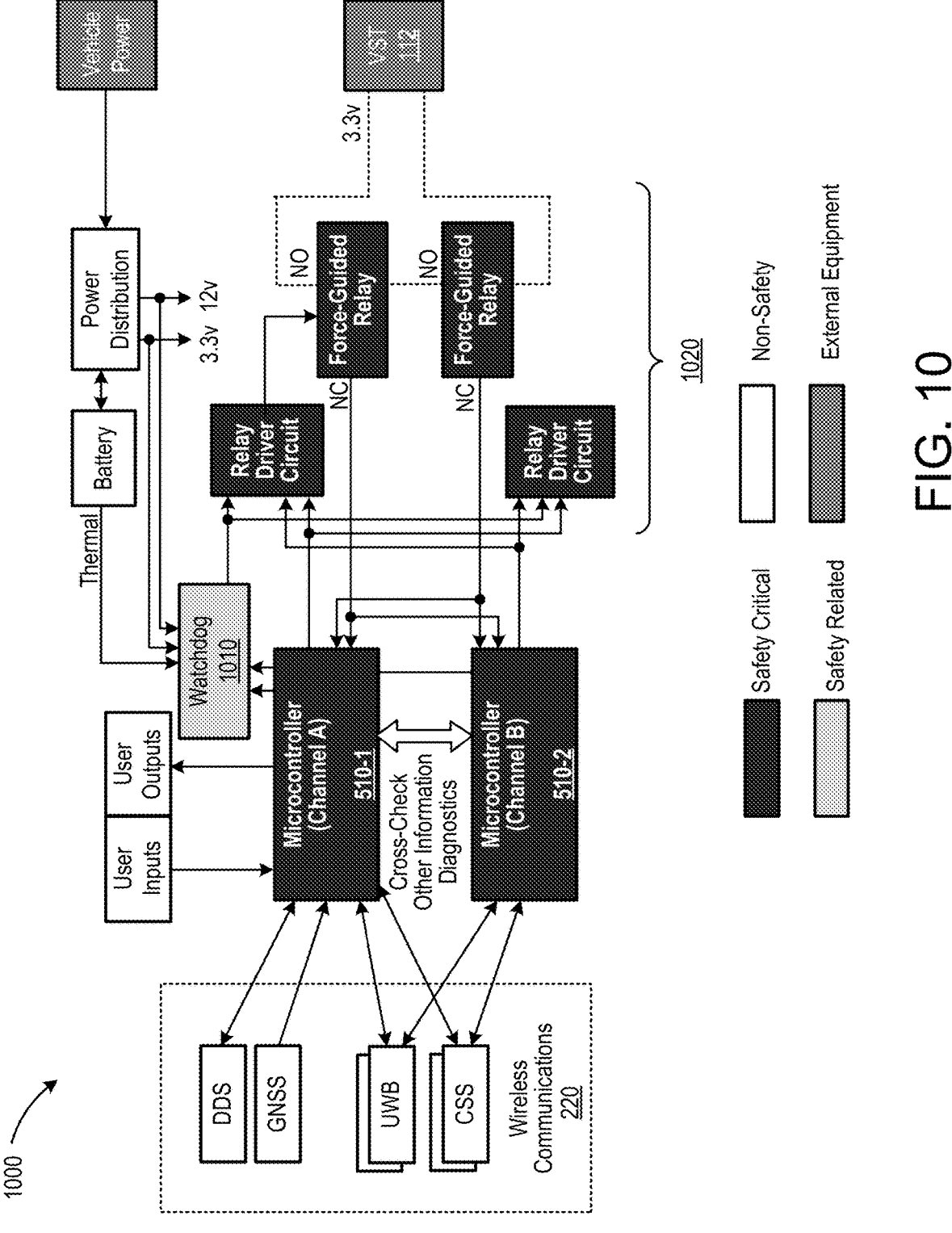
FIG. 10 is an illustrative example block diagram of the safety architecture of the RVM, consistent with the present disclosure.

FIG. 10 is an illustrative example block diagram of the safety architecture of the RVM, generally designated 1000, consistent with the present disclosure. The example of FIG. 10 includes computing devices 510-1 and 510-2, which may be a pair of computing devices using the 2oo2 redundancy as in FIG. 5. Each processor replica monitors the other and triggers a safe state upon detection of a processing discrepancy. Additional redundancy includes dual interfaces 1020 to the VST 112, with redundant connections between the computing devices 510-1 and 510-2 and the dual interfaces 1020. The UWB and CSS transceivers in edge network 220 provide the wireless positioning function to independently determine the relative position of each entity. The Data Distribution Service (DDS) and GNSS provide operational capability to CAS but do not participate in safety functions.

The RVM also includes watchdog 1010 to monitor the computing devices 510-1 and 510-2, and may also monitor the supply voltages, temperature, and processor activity. A collision hazard detection or safety critical failure may result in cutting off the supply power to the vital relays connected to the VST monitor loop circuit. The redundant relays are arranged in series so that either can break the VST monitoring loop when resting in its deenergized state.

Figure 11:
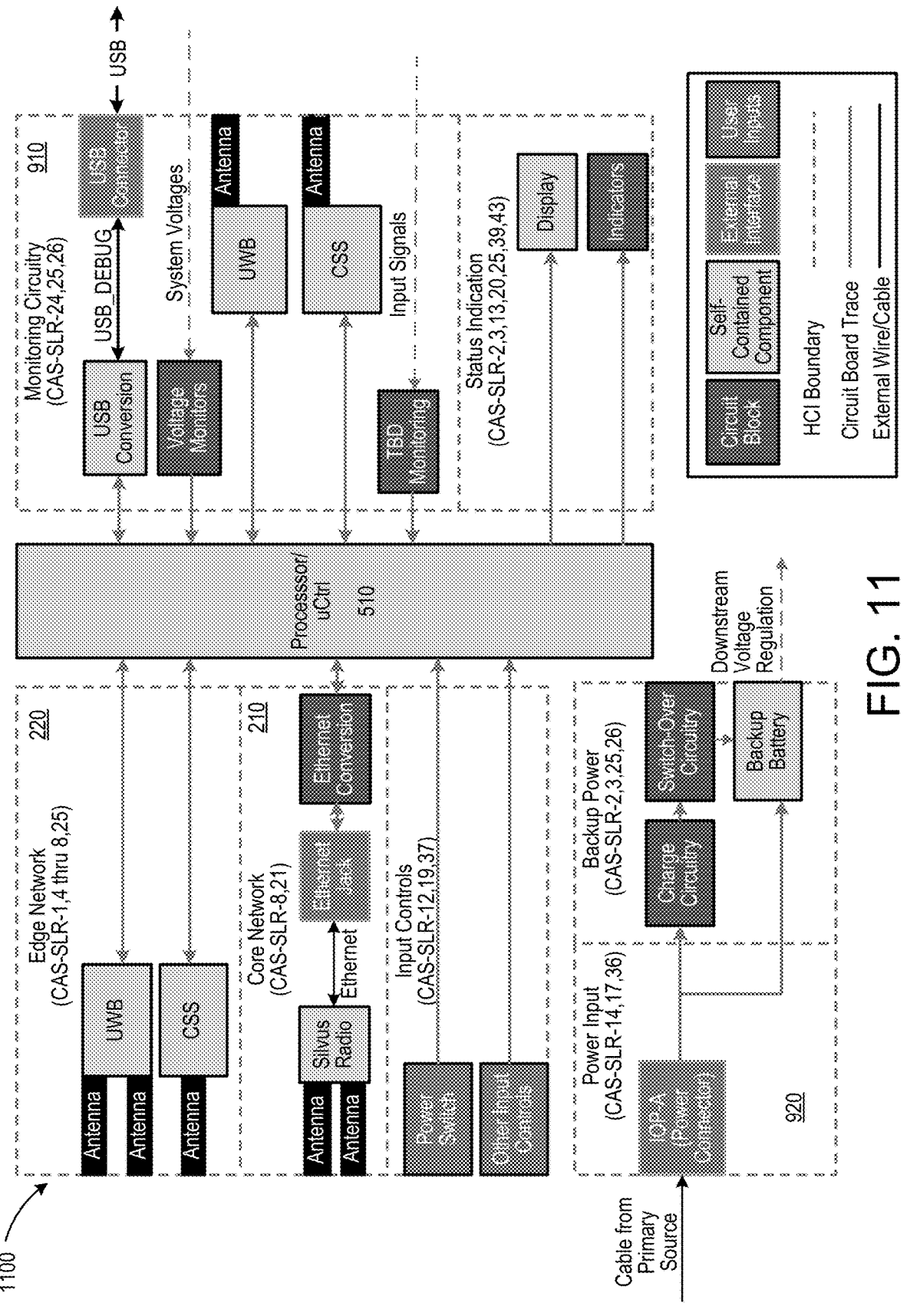
FIG. 11 is an illustrative example block diagram of the non-robotic vehicle module (NVM), consistent with the present disclosure.

FIG. 11 is an illustrative example block diagram of the NVM, generally designated 1100, consistent with the present disclosure. Like the RVM of FIG. 9, the example of FIG. 11 includes computing device 510, which may be a pair of computing devices using the 2oo2 redundancy as in FIG. 5. The NVM also includes edge network 220 and core network 210, and power circuitry 920, which includes the power input as well as the backup power.

Also included is monitoring circuitry 910, which may monitor functions such as the edge networks 220, including both the UWB and CSS, system voltages, and provide status indicators and/or displays.

Figure 12:
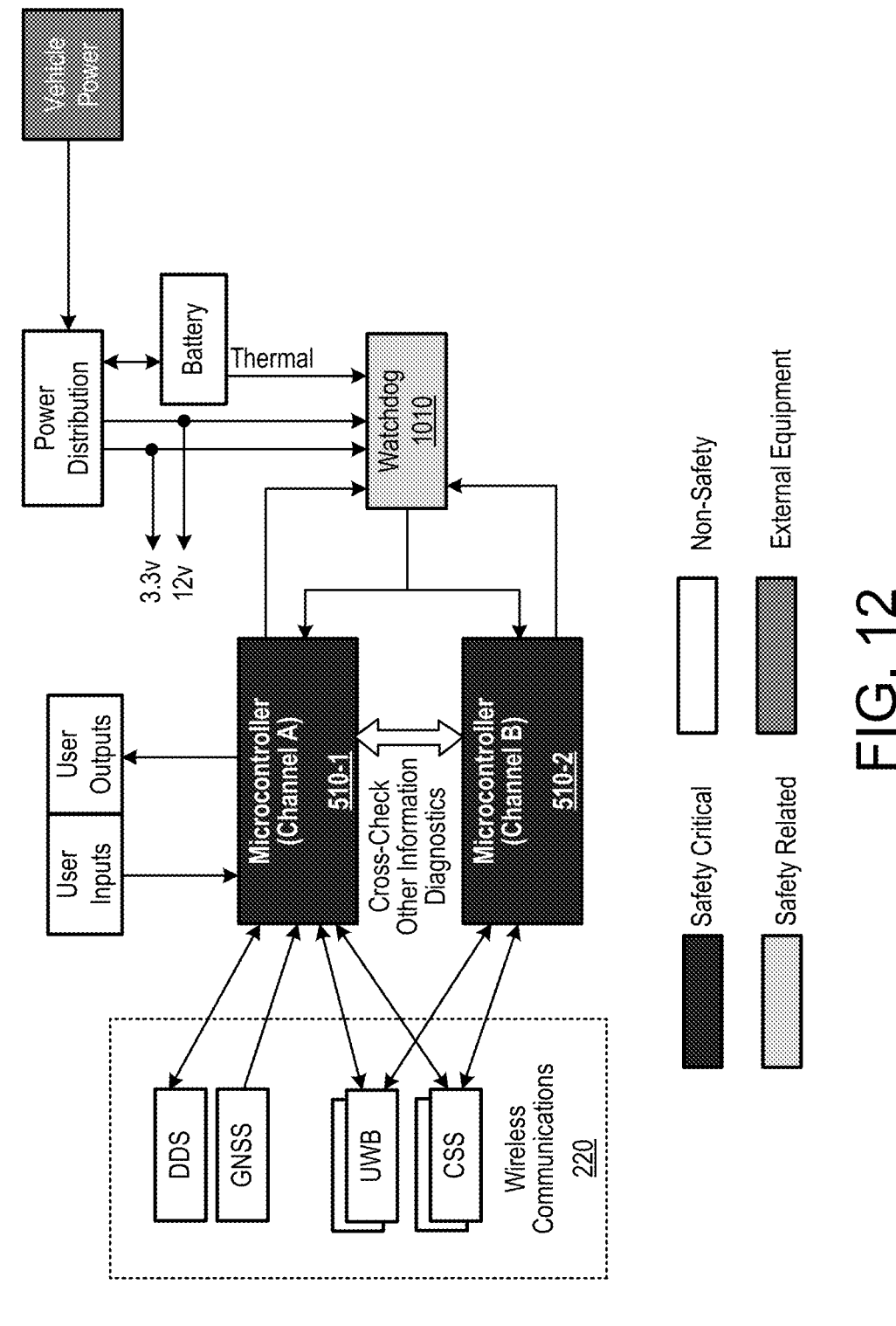
FIG. 12 an illustrative example block diagram of the safety architecture of the NVM, consistent with the present disclosure.

FIG. 12 an illustrative example block diagram of the safety architecture of the NVM, generally designated 1200, consistent with the present disclosure. The NVM module is a subset of the RVM without the Emergency stop interface. Like the safety architecture of the RVM of FIG. 10, the example of FIG. 12 includes computing devices 510-1 and 510-2, which may be a pair of computing devices using the 2oo2 redundancy as in FIG. 5. Each processor replica monitors the other and triggers a safe state upon detection of a processing discrepancy. The NVM participates in the CAS safety function by providing position information to the RVM using the UWB and CSS transceivers. The UWB and CSS transceivers in edge network 220 provide the wireless positioning function to independently determine the relative position of each entity. The DDS and GNSS connections provide operational capability only. The NVM also includes watchdog 1010 to monitor the computing devices 510-1 and 510-2, and may also monitor the supply voltages, temperature, and processor activity.

Figure 13:
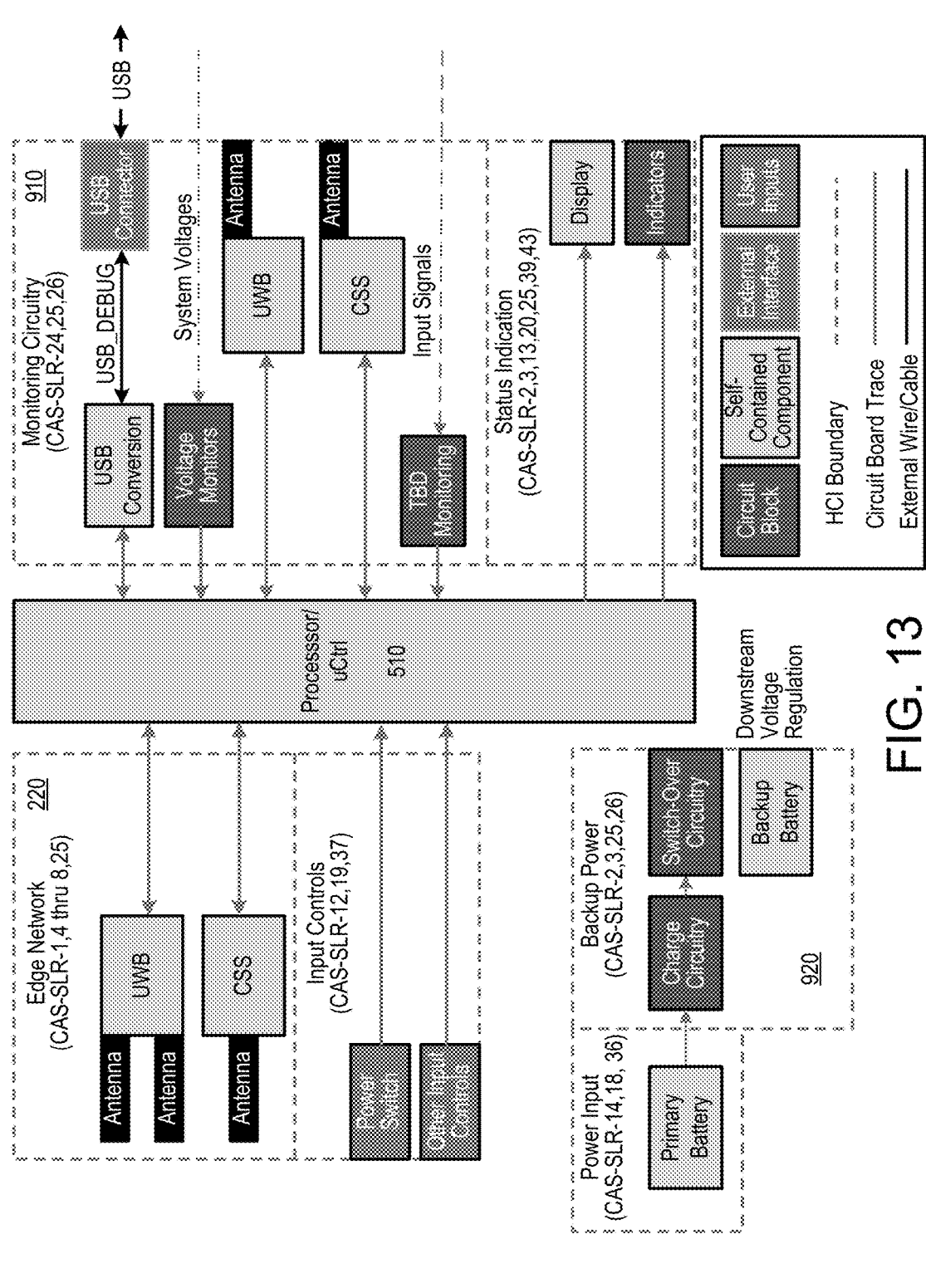
FIG. 13 is an illustrative example block diagram of the wearable module (WM), consistent with the present disclosure.

FIG. 13 is an illustrative example block diagram of the wearable module (WM), generally designated 1300, consistent with the present disclosure. The example of FIG. 13 includes computing device 510, which may be a pair of computing devices using the 2oo2 redundancy as in FIG. 5. The WM also includes edge networks 220 and core network 210, and power circuitry 920, which includes the power input as well as the backup power.

Also included is monitoring circuitry 910, which may monitor functions such as the edge networks 220, including both the UWB and CSS, optional USB interface, system voltages, and provide status indicators and/or displays.

Figure 14:
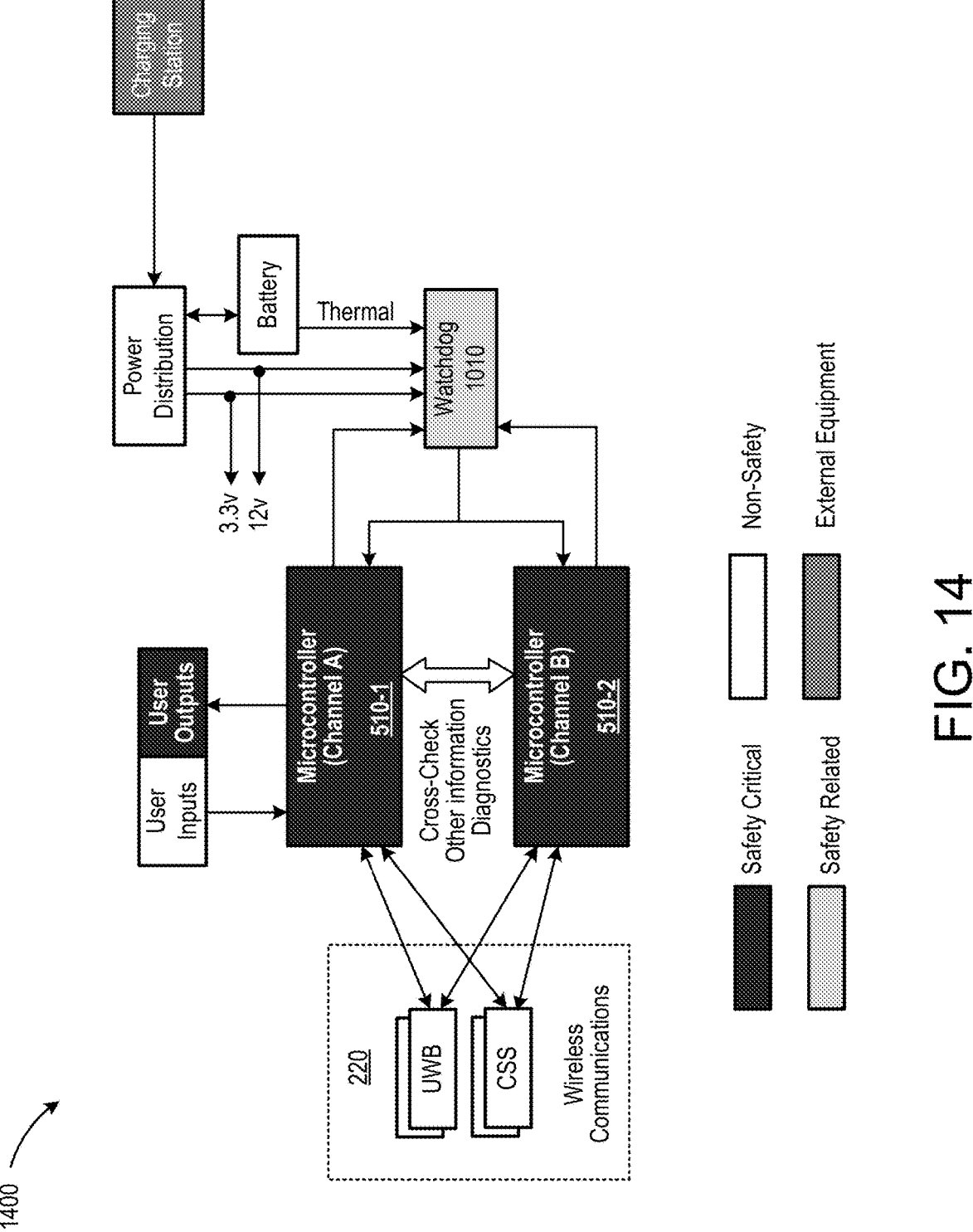
FIG. 14 an illustrative example block diagram of the safety architecture of the WM, consistent with the present disclosure.

FIG. 14 an illustrative example block diagram of the safety architecture of the WM, generally designated 1400, consistent with the present disclosure. The WM module is a subset of the NVM without the DDS or GNSS wireless connections, or the core network radio. Like the safety architecture of the RVM of FIG. 10 and the NVM of FIG. 12, the example of FIG. 14 includes computing devices 510-1 and 510-2, which may be a pair of computing devices using the 2oo2 redundancy as in FIG. 5. Each processor replica monitors the other and triggers a safe state upon detection of a processing discrepancy.

The WM participates in the CAS safety function by providing position information to the RVM using the UWB and CSS transceivers of edge network 220. The WM has one vital output because it is deemed to be hazardous for the WM to indicate that it is active while in a failed or disabled state. The WM also includes watchdog 1010 to monitor the computing devices 510-1 and 510-2, and may also monitor the supply voltages, temperature, and processor activity.

Figure 15:
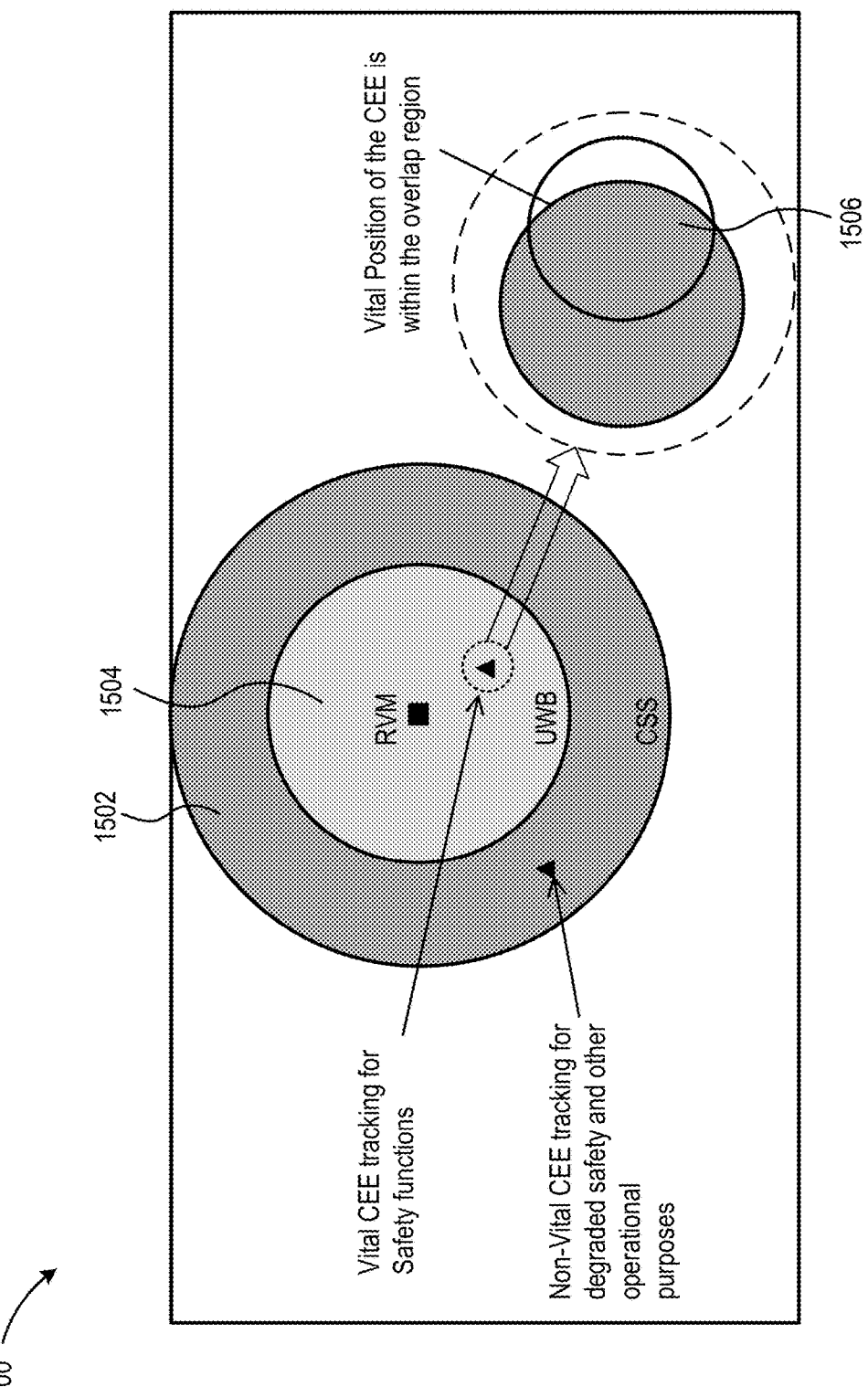
FIG. 15 is an illustrative example relative position detection operation, consistent with the present disclosure.

FIG. 15 is an illustrative example of an entity relative position detection algorithm of the safety architecture of the RVM, consistent with the present disclosure. The CSS and UWB technologies have different ranges and accuracies. Redundant ranging methods helps build the safety case by diversifying the sensor data and removing common failure modes. In the example of FIG. 15, CSS 1502, the outer circle, has a longer range than UWB 1504, but also has less accuracy. UWB 1504, the inner circle, has shorter range than CSS, but has greater accuracy. This creates an outer detection zone where an entity will only be tracked by the CSS system and an inner zone of overlap 1506 where an entity will be tracked by both systems.

Entities located in the inner detection zone can be validated using both the CSS and UWB measurements. The two relative position measurements will be considered valid if any part of their respective uncertainty envelopes overlap. The vital position of the entity may be located within the overlap 1506 of the two position reports. If one of the two ranging technologies becomes inoperable, the system can still operate in a degraded performance mode.

Figure 16:
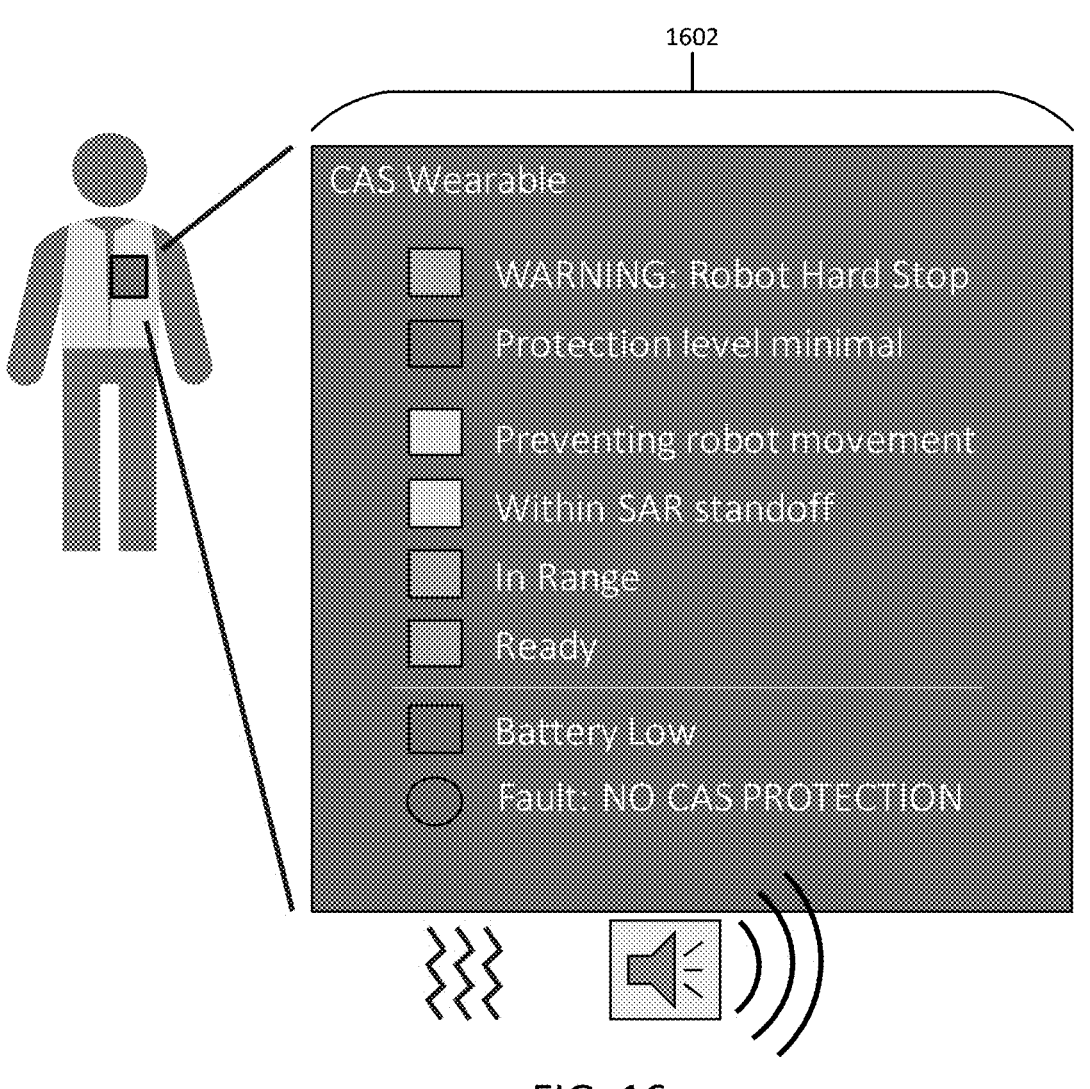
FIG. 16 is an illustrative example of a user interface for the WM, consistent with the present disclosure.

FIG. 16 is an illustrative example of a UI for the WM, consistent with the present disclosure. The example UI of FIG. 16 may include visual, haptic, and audio feedback to the user, e.g., a dismount. This example UI does not provide an input capability, except for an on/off capability, but in other embodiments, input controls may be incorporated. The visual feedback to the user may include prioritized light-emitting diode (LED) type indications, e.g., WARNING: Robot Hard Stop, Protection level minimal, Preventing robot movement, Within Safety Assessment Report (SAR) standoff, In Range, Ready, Battery Low, and Fault: NO CAS PROTECTION. In some embodiments, the UI is mounted to be most readable by wearer, e.g., "upside down" from the depiction in FIG. 16 so as to be readable by the user looking down at the UI as mounted. An example of an audio feedback may be, "Alert: causing a Hard Stop."

Figure 17:
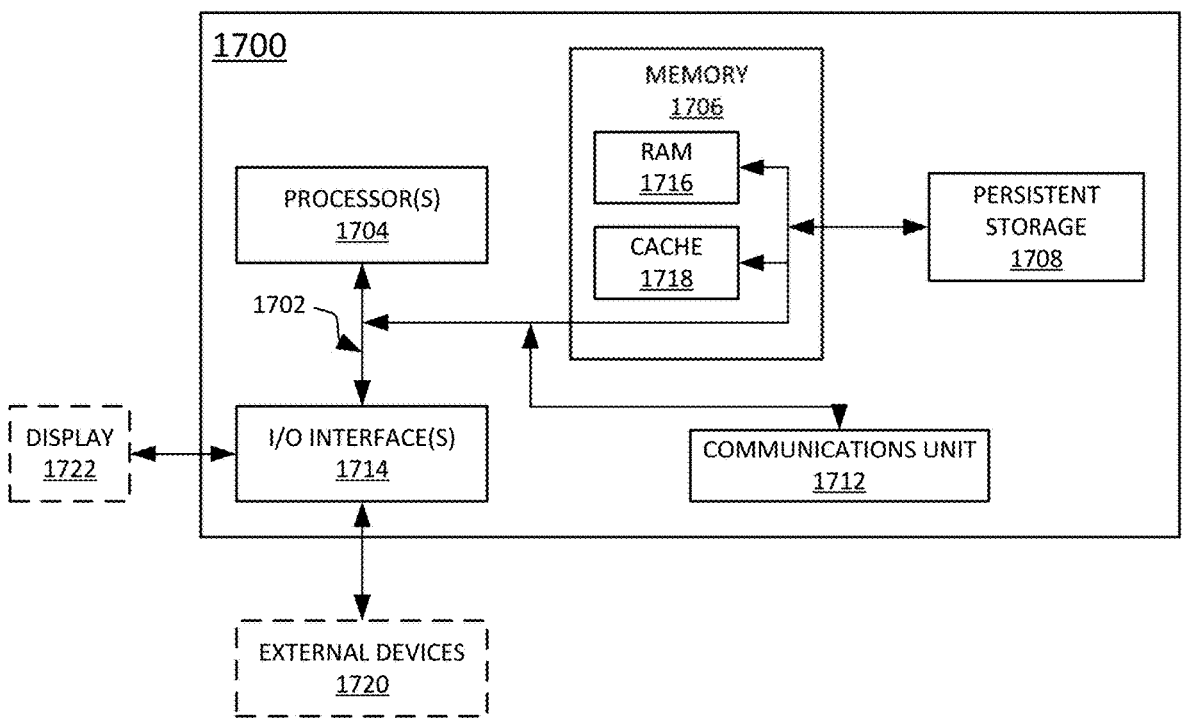
FIG. 17 depicts a block diagram of components of a typical computing devices executing the CAS functions within the system for autonomously or remotely operating robotic assets of FIG. 1, in accordance with an embodiment of the present disclosure.

FIG. 17 depicts a block diagram of components of a typical computing devices executing the CAS functions within the system for autonomously or remotely operating robotic assets of FIG. 1, in accordance with an embodiment of the present disclosure. FIG. 17 displays the computing device or computer 1700, one or more processor(s) 1704 (including one or more computer processors), a communications fabric 1702, a memory 1706 including, a random-access memory (RAM) 1716 and a cache 1718, a persistent storage 1708, a communications unit 1712, I/O interfaces 1714, a display 1722, and external devices 1720. It should be appreciated that FIG. 17 provides only an illustration of one embodiment and does not imply any limitations with regard to the environments in which different embodiments may be implemented. Many modifications to the depicted environment may be made.

As depicted, the computer 1700 operates over the communications fabric 1702, which provides communications between the computer processor(s) 1704, memory 1706, persistent storage 1708, communications unit 1712, and input/output (I/O) interface(s) 1714. The communications fabric 1702 may be implemented with an architecture suitable for passing data or control information between the processors 1704 (e.g., microprocessors, communications processors, and network processors), the memory 1706, the external devices 1720, and any other hardware components within a system. For example, the communications fabric 1702 may be implemented with one or more buses.

The memory 1706 and persistent storage 1708 are computer readable storage media. In the depicted embodiment, the memory 1706 comprises a RAM 1716 and a cache 1718. In general, the memory 1706 can include any suitable volatile or non-volatile computer readable storage media. Cache 1718 is a fast memory that enhances the performance of processor(s) 1704 by holding recently accessed data, and near recently accessed data, from RAM 1716.

Program instructions for the CAS may be stored in the persistent storage 1708, or more generally, any computer readable storage media, for execution by one or more of the respective computer processors 1704 via one or more memories of the memory 1706. The persistent storage 1708 may be a magnetic hard disk drive, a solid-state disk drive, a semiconductor storage device, flash memory, read only memory (ROM), electronically erasable programmable read-only memory (EEPROM), or any other computer readable storage media that is capable of storing program instruction or digital information.

The media used by persistent storage 1708 may also be removable. For example, a removable hard drive may be used for persistent storage 1708. Other examples include optical and magnetic disks, thumb drives, and smart cards that are inserted into a drive for transfer onto another computer readable storage medium that is also part of persistent storage 1708.

The communications unit 1712, in these examples, provides for communications with other data processing systems or devices. In these examples, the communications unit 1712 includes one or more network interface cards. The communications unit 1712 may provide communications through the use of either or both physical and wireless communications links. In the context of some embodiments of the present disclosure, the source of the various input data may be physically remote to the computer 1700 such that the input data may be received, and the output similarly transmitted via the communications unit 1712.

The I/O interface(s) 1714 allows for input and output of data with other devices that may be connected to computer 1700. For example, the I/O interface(s) 1714 may provide a connection to external device(s) 1720 such as a keyboard, a keypad, a touch screen, a microphone, a digital camera, and/or some other suitable input device. External device(s) 1720 can also include portable computer readable storage media such as, for example, thumb drives, portable optical or magnetic disks, and memory cards. Software and data used to practice embodiments of the present disclosure can be stored on such portable computer readable storage media and can be loaded onto persistent storage 1708 via the I/O interface(s) 1714. I/O interface(s) 1714 also connect to a display 1722.

Display 1722 provides a mechanism to display data to a user and may be, for example, a computer monitor. Display 1722 can also function as a touchscreen, such as a display of a tablet computer.

According to one aspect of the disclosure there is thus provided a vehicle collision avoidance system (CAS), the system including: a first CAS module for a robotic vehicle, the first CAS module further comprising: an interface to a first network; an emergency stop interface communicatively coupled to the robotic vehicle; at least one computer processor; one or more computer readable storage media; and program instructions stored on the one or more computer readable storage media for execution by at least one of the at least one computer processor. The stored program instructions include instructions to: determine a relative position of a second CAS module based on information from the first network; responsive to determining that the second CAS module is within a first distance from the first CAS module, issue an alert; and responsive to determining that the second CAS module is within a second distance from the first CAS module, transmit a hard stop signal to the robotic vehicle.

According to another aspect of the disclosure there is thus provided a method for collision avoidance, the method including: determining a relative position of a second collision avoidance system (CAS) module based on information from a first network; responsive to determining that the second CAS module is within a first distance from a first CAS module, issuing an alert; and responsive to determining that the second CAS module is within a second distance from the first CAS module, transmitting a hard stop signal to a robotic vehicle.

According to yet another aspect of the disclosure there is thus provided an apparatus for collision avoidance, the apparatus including: an interface to an edge network; monitoring circuitry; and at least one computer processor. The at least one computer processor configured to: determine a relative position of a second collision avoidance system (CAS) module based on information from the edge network; responsive to determining that the second CAS module is within a first distance from a first CAS module, issue an alert; and responsive to determining that the second CAS module is within a second distance from the first CAS module, transmit a hard stop signal to a robotic vehicle.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

"Circuitry," and "module" as used in any embodiment herein, may comprise, for example, singly or in any combination, hardwired circuitry, programmable circuitry such as processors comprising one or more individual instruction processing cores, state machine circuitry, and/or firmware that stores instructions executed by programmable circuitry and/or future computing circuitry including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), application-specific integrated circuit (ASIC), programmable logic devices (PLD), digital signal processors (DSP), field programmable gate array (FPGA), logic gates, registers, semiconductor device, chips, microchips, chip sets, etc.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods. Thus, for example, the persistent storage 1708 may store instructions (in, for example, firmware or software) to perform the operations described herein. The storage medium, e.g. the persistent storage 1708, may include any type of tangible medium, for example, any type of disk optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. An apparatus for collision avoidance, the apparatus comprising:

an interface to an edge network;

monitoring circuitry; and at least one computer processor, the at least one computer processor configured to:

determine a relative position of a second collision avoidance system (CAS) module based on information from the edge network;

responsive to determining that the second CAS module is within a first distance from a first CAS module, issue an alert;

responsive to determining that the second CAS module is within a second distance from the first CAS module, transmit a hard stop signal to a robotic vehicle to control the robotic vehicle to perform a hard stop;

detect a heartbeat safety signal from the second CAS module; and responsive to not detecting the heartbeat safety signal from the second CAS module, transmit the hard stop signal to the robotic vehicle to control the robotic vehicle to perform the hard stop.

2. The apparatus of claim 1, wherein the edge network further comprises:

an Ultra-Wide Band (UWB) radio; and a Chirp Spread Spectrum (CSS) radio.

3. The apparatus of claim 1, further comprising:

a Vehicle Safety Transponder (VST) interface, the VST interface configured to transmit the hard stop signal to the robotic vehicle.

4. The apparatus of claim 1, further comprising:

input controls; and status indication, wherein the status indication includes at least one of warning: robot hard stop, protection level minimal, preventing robot movement, within safety assessment report (SAR) standoff, in range, ready, battery low, and fault: no CAS protection.

5. The apparatus of claim 1, further comprising two computer processors, wherein the two computer processors are arranged in a two-out-of-two (2oo2) checked redundancy configuration, and configured to:

compare data between the two computer processors; and responsive to the data conflicting between the two computer processors, cause the system to transmit the hard stop signal to the robotic vehicle.

6. The apparatus of claim 1, wherein the relative position of the second CAS module is determined by calculating a Euclidian distance of a signal propagation path based on Time of Flight (ToF) measurements of one or more signals received over the edge network.

* * * * *